United States Patent
Kang et al.

(10) Patent No.: US 12,316,464 B2
(45) Date of Patent: May 27, 2025

(54) METHOD AND APPARATUS FOR SUPPORTING PACKET DUPLICATE TRANSMISSION BY USING SIDELINK IN WIRELESS COMMUNICATION SYSTEM

(71) Applicant: Samsung Electronics Co., Ltd., Suwon-si (KR)

(72) Inventors: Hyunjeong Kang, Suwon-si (KR); Anil Agiwal, Suwon-si (KR); Sangkyu Baek, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 337 days.

(21) Appl. No.: 17/760,089

(22) PCT Filed: Feb. 3, 2021

(86) PCT No.: PCT/KR2021/001412
§ 371 (c)(1),
(2) Date: Aug. 3, 2022

(87) PCT Pub. No.: WO2021/158010
PCT Pub. Date: Aug. 12, 2021

(65) Prior Publication Data
US 2023/0060749 A1 Mar. 2, 2023

(30) Foreign Application Priority Data
Feb. 3, 2020 (KR) .......................... 10-2020-0012824

(51) Int. Cl.
*H04W 28/00* (2009.01)
*H04L 1/1867* (2023.01)
*H04W 28/04* (2009.01)

(52) U.S. Cl.
CPC ............. *H04L 1/189* (2013.01); *H04W 28/04* (2013.01)

(58) Field of Classification Search
None
See application file for complete search history.

(56) References Cited

U.S. PATENT DOCUMENTS 10,542,583 B1 1/2020 Pan et al.
2019/0215685 A1* 7/2019 Wang ...................... H04W 4/40
(Continued)

FOREIGN PATENT DOCUMENTS

KR 10-2020-0002645 A 1/2020
WO 2020006388 A1 1/2020

OTHER PUBLICATIONS

Supplementary European Search Report dated Jun. 21, 2023, in connection with European Patent Application No. 21750087.5, 7 pages.

(Continued)

*Primary Examiner* — Brandon M Renner

(57) ABSTRACT

An operating method of a first terminal in a wireless communication system according to an embodiment of the disclosure may include: obtaining capability information of a second terminal; transmitting, to the second terminal, duplication transmission information for performing duplication transmission of a sidelink, based on the capability information; and performing duplication transmission of the sidelink based on the duplication transmission information, wherein the duplication transmission information includes sidelink radio bearer information, sidelink destination identifier information, and sidelink carrier information.

20 Claims, 25 Drawing Sheets

(56) References Cited

U.S. PATENT DOCUMENTS

| | | | |
|---|---|---|---|
| 2019/0239112 A1* | 8/2019 | Rao | H04L 1/08 |
| 2019/0253927 A1 | 8/2019 | Mok et al. | |
| 2019/0254062 A1* | 8/2019 | Wu | H04W 76/14 |
| 2020/0177497 A1* | 6/2020 | Xiao | H04W 76/15 |
| 2021/0006954 A1* | 1/2021 | Xu | H04W 28/0205 |
| 2021/0051653 A1* | 2/2021 | Park | H04W 8/22 |

OTHER PUBLICATIONS

International Search Report and Written Opinion of the International Searching Authority dated May 14, 2021, in connection with International Application No. PCT/KR2021/001412, 13 pages.
Qualcomm Incorporated, "Introduction of Rel-16 eMTC enhancements," R2-1911607, 3GPP TSG-RAN2 Meeting #107, Prague, Czechia, Aug. 26-30, 2019, 690 pages.
Communication under Rule 71(3) EPC dated Sep. 18, 2024, in connection with European Application No. 21750087.5, 97 pages.

* cited by examiner

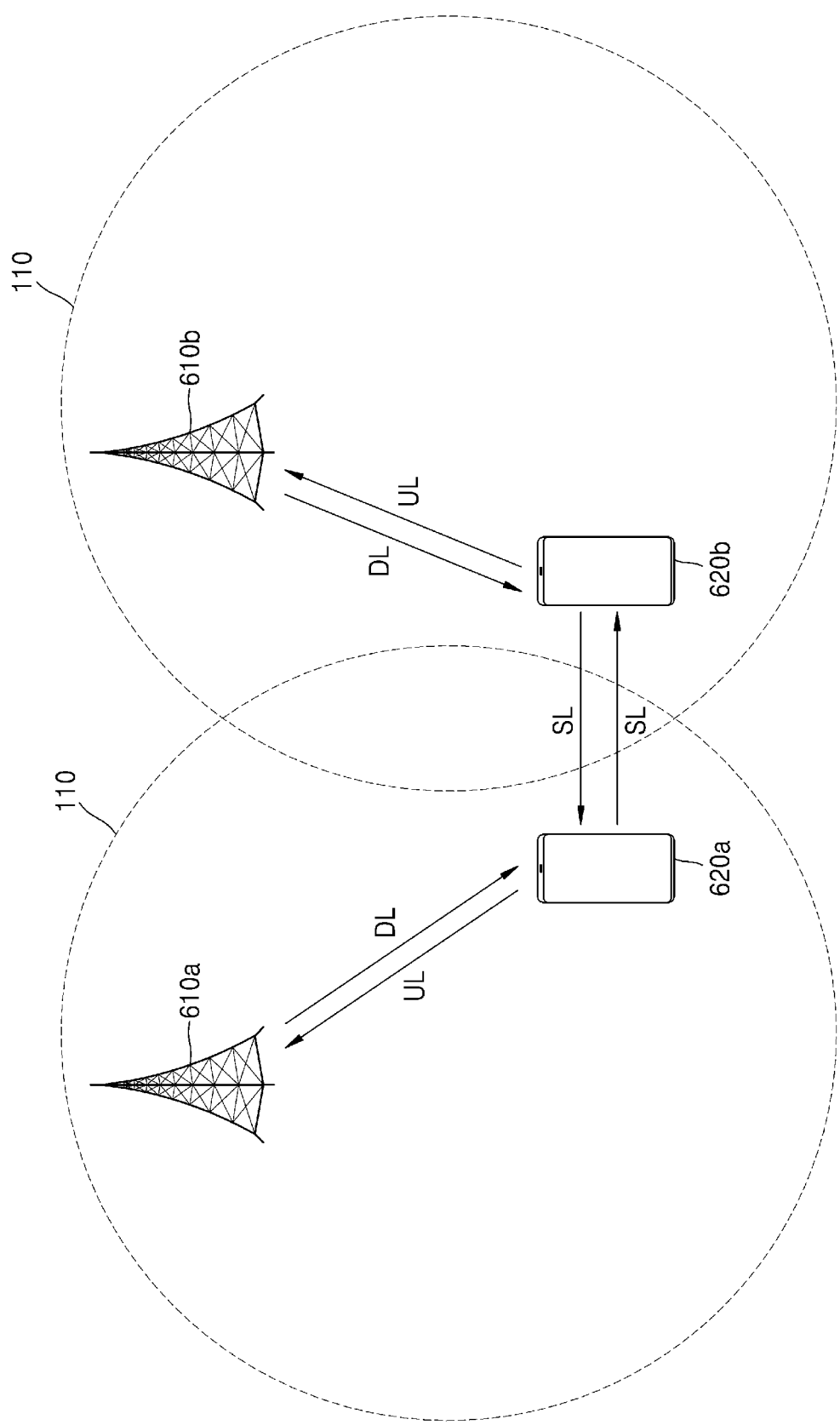

METHOD AND APPARATUS FOR SUPPORTING PACKET DUPLICATE TRANSMISSION BY USING SIDELINK IN WIRELESS COMMUNICATION SYSTEM

CROSS-REFERENCE TO RELATED APPLICATIONS

This application is a 371 National Stage of International Application No. PCT/KR2021/001412, filed Feb. 3, 2021, which claims priority to Korean Patent Application No. 10-2020-0012824, filed Feb. 3, 2020, the disclosures of which are herein incorporated by reference in their entirety.

BACKGROUND

1. Field

The present disclosure relates to a wireless communication system, and more particularly, to a method and apparatus for processing an operation of a terminal that transmits and receives the same packet in one or more sidelink carriers.

2. Description of Related Art

To meet the demand for wireless data traffic having increased since deployment of 4th Generation (4G) communication systems, efforts have been made to develop an improved 5th Generation (5G) or pre-5G communication system. Therefore, the 5G or pre-5G communication system is also called a 'Beyond 4G Network' or a 'Post Long-Term Evolution (LTE) System'.

The 5G communication system is considered to be implemented in ultra-high frequency (millimeter (mm)Wave) bands, (e.g., 60 gigahertz (GHz) bands), so as to accomplish higher data rates. In order to mitigate path loss of radio waves and increase a propagation distance of radio waves in an ultra-high frequency band, beamforming, massive multiple-input and multiple-output (MIMO), full-dimensional MIMO (FD-MIMO), array antenna, analog beamforming, and large-scale antenna technologies have been discussed in 5G communication systems.

In addition, in order to improve a network of a 5G communication system, technologies such as evolved small cells, advanced small cells, cloud radio access networks (cloud RANs), ultra-dense networks, device-to-device (D2D) communication, wireless backhaul, moving networks, cooperative communication, Coordinated Multi-Points (CoMP), and received-interference cancelation, have been developed.

In addition, for 5G communication systems, hybrid frequency shift keying (FSK) and quadrature amplitude modulation (QAM) (FQAM) and sliding window superposition coding (SWSC), which are advanced coding modulation (ACM) schemes, and filter bank multi-carrier (FBMC), non-orthogonal multiple access (NOMA), and sparse code multiple access (SCMA), which are advanced access technologies, have been developed.

The Internet has evolved from a human-centered connection network, through which humans generate and consume information, to an Internet-of-Things (IoT) network that exchanges and processes information between distributed elements such as objects. Internet-of-Everything (IoE) technology in which a big data processing technology via a connection with a cloud server or the like is combined with the IoT technology has also emerged. In order to implement IoT, technical factors, such as sensing technology, wired/wireless communication, network infrastructure, service-interface technology, and security technology are required, and research on technologies, such as a sensor network, machine-to-machine (M2M) communication, machine-type communication (MTC), and the like for connection between objects has recently been conducted. In an IoT environment, via collection and analysis of data generated from connected objects, an intelligent internet technology (IT) service to create new value for peoples' lives may be provided. IoT may be applied to various fields, such as smart homes, smart buildings, smart cities, smart cars or connected cars, smart grids, health care, smart home appliances, or high-tech medical services, via the convergence and combination of existing information technologies and various industries.

Accordingly, various attempts are being made to apply 5G communication systems to IoT networks. For example, technologies such as a sensor network, M2M communication, and MTC are implemented by beamforming, MIMO, or array antenna schemes. The application of cloud RAN as the big data processing technology described above may be an example of convergence of 5G communication technology and IoT technology.

Furthermore, terminal-to-terminal direct communication (sidelink communication) using a 5G communication system has been studied, and the terminal-to-terminal direct communication is expected to be applied to, for example, vehicular communication (e.g., vehicle-to-everything, hereinafter, 'V2X') and provide various services to a user.

As described above, various services are now providable with the development of wireless communication systems, and accordingly, there is a need for a method of effectively controlling transmission of the same packet on one or more sidelink carriers.

SUMMARY

The present disclosure provides a method and apparatus for allowing a terminal to transmit and receiving the same packet on one or more sidelink carriers in a wireless communication system.

According to an embodiment of the present disclosure, an operating method of a first terminal in a wireless communication system may include: obtaining capability information of a second terminal; transmitting, to the second terminal, duplication transmission information for performing duplication transmission of a sidelink, based on the capability information; and performing duplication transmission of the sidelink based on the duplication transmission information, wherein the duplication transmission information includes sidelink radio bearer information, sidelink destination identifier information, and sidelink carrier information.

The method may further include obtaining, from a base station, configuration information for a sidelink bearer.

The configuration information may be obtained via a system information block (SIB) or RRC signaling.

The method may further include receiving, from the second terminal, a response message based on the duplication transmission information, and the response message may include a T-reordering value.

The method may further include determining whether to deactivate the duplication transmission of the sidelink.

The method may further include transmitting, based on a result of the determining, information about an inactivated sidelink bearer to the second terminal or a base station.

The duplication transmission of the sidelink may be configured for each RLC entity or each sidelink bearer.

The duplication transmission information may further include at least one of a sidelink logical channel group mapped to a sidelink carrier, a sidelink logical channel mapped to the sidelink carrier, and reception resource pool information of each sidelink carrier.

According to an embodiment of the present disclosure, a first terminal in a wireless communication system may include: a transceiver; and at least one processor connected to the transceiver, wherein the at least one processor may be configured to obtain capability information of a second terminal, transmit, to the second terminal, duplication transmission information for performing duplication transmission of a sidelink, based on the capability information, and perform duplication transmission of the sidelink based on the duplication transmission information, and the duplication transmission information includes sidelink radio bearer information, sidelink destination identifier information, and sidelink carrier information.

The at least one processor may be further configured to obtain, from a base station, configuration information for a sidelink bearer.

The at least one processor may be further configured to receive, from the second terminal, a response message based on the duplication transmission information, and the response message may include a T-reordering value.

The at least one processor may be further configured to determine whether to deactivate the duplication transmission of the sidelink.

The at least one processor may be further configured to transmit, based on a result of the determining, information about an inactivated sidelink bearer to the second terminal or a base station.

BRIEF DESCRIPTION OF THE DRAWINGS

FIG. 6D is a diagram illustrating a scenario for sidelink communication according to an embodiment of the present disclosure.

DETAILED DESCRIPTION

Figure 1:
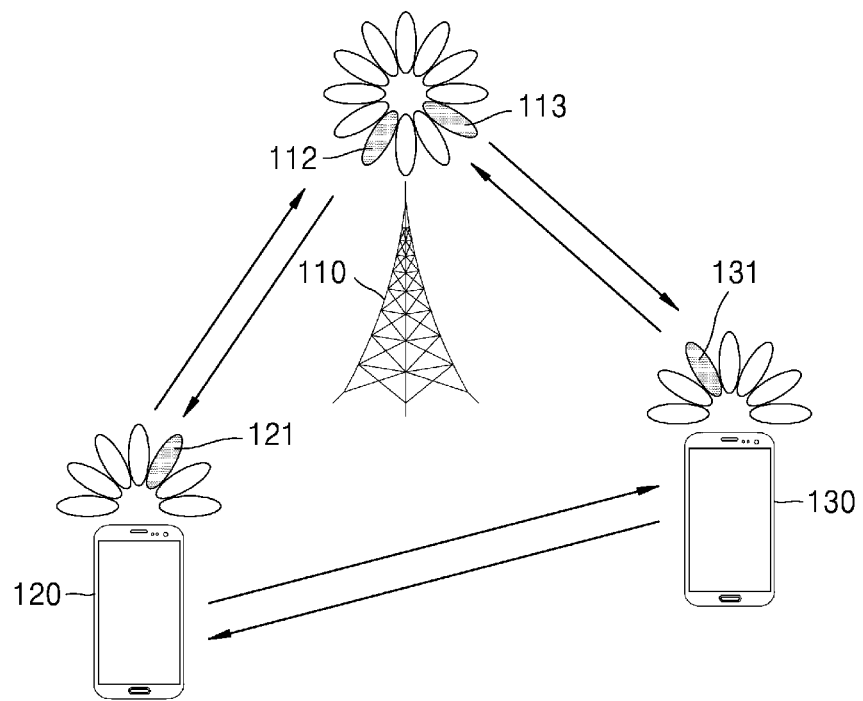
FIG. 1 illustrates a wireless communication system according to an embodiment of the present disclosure.

Hereinafter, preferred embodiments of the present disclosure will be described with reference to the accompanying drawings. Here, it should be noted that the same elements in the accompanying drawings are represented by the same reference numerals. In addition, a detailed description of known functions and configurations that may obscure the gist of the present disclosure will be omitted.

In the description of embodiments, technical features that are well known to the technical field to which the present disclosure belongs but are not directly associated with the present disclosure are not described. This is not to obscure but to clearly deliver the gist of the present disclosure by omitting an unnecessary description.

For the same reason, in the accompanying drawings, some elements are exaggerated, omitted, or schematically shown. In addition, sizes of elements do not fully reflect actual sizes thereof. Like reference numbers are used to refer to like elements through at the drawings.

Advantages and features of the present disclosure and a method for achieving them will be apparent with reference to embodiments of the present disclosure described below together with the attached drawings. The present disclosure may, however, be embodied in many different forms and should not be construed as being limited to the embodiments set forth herein, rather, these embodiments are provided such that the present disclosure will be thorough and complete, and will fully convey the concept of the present disclosure to those of ordinary skill in the art, and the present disclosure will be defined only by the concept of the claims. Like reference numerals denote like elements throughout the specification.

Here, it could be understood that each block in processing flowchart drawings and combinations of flowchart drawings may be performed by computer program instructions. These computer program instructions may be loaded in a processor of a general-purpose computer, a particular-purpose computer, or other programmable data processing equipment, and thus, the instructions performed by a processor of a computer or other programmable data processing equipment may generate a means configured to perform functions described in flowchart block(s). These computer program instructions may also be stored in a computer-executable or computer-readable memory capable of orienting a computer or other programmable data processing equipment to implement a function in a particular mode, and thus, the instructions stored in the computer-executable or computer-readable memory may also produce a production item involving an instruction means configured to perform a function described in flowchart block(s). These computer program instructions may also be loaded in a computer or other programmable data processing equipment, and thus, a computer-executable process may also be generated by performing a series of operation steps on the computer or the other programmable data processing equipment so that the instructions executed in the computer or the other programmable data processing equipment provide steps for executing functions described in flowchart block(s).

In addition, each block may indicate a portion of a module, a segment, or a code including one or more executable instructions for executing particular logical function(s). Also, in several substitutional embodiments, functions described in blocks may also be out of a sequence. For example, two consecutively shown blocks may be substantially performed at the same time in fact, or the blocks may be sometimes performed in a reverse order according to a corresponding function.

The term ' . . . unit' used in the embodiments denotes a component including software or hardware, such as a field programmable gate array (FPGA) or an application-specific integrated circuit (ASIC), and the ' . . . unit' performs certain roles. However, the ' . . . unit' does not always have a meaning limited to software or hardware. The ' . . . unit' may be configured either to be stored in an addressable storage medium or to execute one or more processors. Therefore, for example, the ' . . . unit' includes components, such as software components, object-oriented software components, class components, and task components, processes, functions, attributes, procedures, subroutines, segments of program code, drivers, firmware, microcode, circuits, data, a database, data structures, tables, arrays, and variables. A function provided inside components and ' . . . units' may be combined into a smaller number of components and ' . . . units' or be further divided into additional components and ' . . . units'. In addition, components and ' . . . units' may be implemented to reproduce one or more central processing units (CPUs) inside a device or a security multimedia card.

In describing the embodiments of the present disclosure in detail, the main focus is placed on the radio access network (i.e. new RAN (NR)) and the packet core (i.e., 5th Generation (5G) system, 5G core network, or Next Generation Core (NG Core)), which is the core network according to the 5G mobile communication standard specified by 3rd Generation Partnership Project (3GPP), which is a mobile communication standardization organization, but it will be understood by those skilled in the art that the gist of the present disclosure is applicable to other communication systems having similar technical backgrounds without significant modifications departing from the scope of the present disclosure.

In a 5G system, a network data collection and analysis function (NWDAF), which is a network function that provides a function of analyzing data collected from a 5G network and providing an analysis result, may be defined to support network automation. The NWDAF may collect/store/analyze information from 5G networks and provide the results to unspecific network functions (NF), and the analysis results may be used independently by each NF.

In the following description, terms and names defined in the 3GPP Long-Term Evolution (LTE) standards (standards of 5G, NR, LTE or similar systems) may be used for the convenience of description. However, the present disclosure is not limited by these terms and names, and may be applied in the same way to systems that conform other standards.

The present disclosure relates to a method and apparatus for transmitting and receiving the same data on one or more sidelink carriers in a wireless communication system. The present disclosure provides a method and apparatus for allowing terminals capable of performing transmission and reception based on sidelink unicast, sidelink groupcast, sidelink broadcast in a wireless communication system, to transmit and receive the same packet data convergence protocol (PDCP) protocol data unit (PDU) on one or more sidelink carriers. In detail, the present disclosure is for transmitting and receiving the same PDCP PDU on one or more sidelink carriers in order to support sidelink communication between terminals, and may include operations, performed by a terminal and a base station, of processing configuration of transmission and reception of sidelink duplicate data. According to an embodiment of the present disclosure, a terminal may increase a data reception rate by transmitting the same data through one or more sidelinks, thereby increasing the packet transmission/reception reliability in terminal-to-terminal direct communication.

Hereinafter, terms indicating signals, terms indicating channels, terms indicating control information, terms indicating network entities, and terms indicating components of an apparatus are exemplary for convenience of description. Accordingly, the present disclosure is not limited to the terms used herein, and may use other terms having technically identical meaning.

Hereinafter, a base station (BS) is an entity that allocates resources to a terminal, and may be at least one of a gNode B, an eNode B, a Node B, a radio access unit, a base station (BS) controller, or a node on a network. A terminal may include a user equipment (UE), a mobile station (MS), a cellular phone, a smart phone, a computer, or a multimedia system capable of performing a communication function. However, they are merely examples, and the terms 'BS' and 'terminal' are not limited thereto. In the present disclosure, for convenience of descriptions, the terms 'eNB' and 'gNB' may be interchangeably used. That is, a BS mentioned as an eNB may refer to a gNB. In the present disclosure, the term 'terminal' may represent various wireless communication devices, as well as cellular phones, narrowband internet of Things (NB-IoT) devices, and sensors.

In the following description, the terms 'physical channel' and 'signal' may be interchangeably used with the term 'data' or 'control signal'. For example, the term 'physical downlink shared channel (PDSCH)' refers to a physical channel on which data is transmitted, but the term 'PDSCH' may also be used to indicate data. That is, in the present disclosure, the expression 'transmit a physical channel' may be understood as the same meaning as the expression 'transmit data or a signal via a physical channel'.

Throughout the specification, the term 'higher layer signaling' refers to a method of transferring a signal to a terminal from a BS by using a downlink data channel of a physical layer or to the BS from the terminal by using an uplink data channel of the physical layer. The term 'higher layer signaling' may be understood as radio resource control (RRC) signaling or a media access control (MAC) control element (CE).

In addition, although the expression 'more than' or 'less than' may be used herein in order to determine whether or not a specific condition is satisfied or fulfilled, this is only for describing an example and does not exclude the expression 'greater than or equal to' or 'less than or equal to'. The expression 'greater than or equal to' may be replaced with 'greater than', the expression 'less than or equal to' may be replaced with 'less than', and the expression 'greater than or equal to x and less than y' may be replaced with 'greater than x and less than or equal to y'.

In addition, although embodiments of the present disclosure will be described by using terms used in a certain communication standard (e.g., 3GPP), the terms are merely examples for explanation. The embodiments of the present disclosure may also be easily modified and applied to other communication systems.

FIG. 1 illustrates a wireless communication system according to an embodiment of the present disclosure.

FIG. 1 illustrates a BS 110, a terminal 120, and a terminal 130, as parts of nodes using a radio channel in the wireless communication system. Although FIG. 1 illustrates only one BS, the wireless communication system may further include other BSs identical or similar to the BS 110.

The BS 110 is a network infrastructure that provides the terminals 120 and 130 with wireless access. The BS 110 has a coverage defined as a certain geographic area based on a range within which signals can be transmitted. The BS 110 may be referred to as an access point (AP), an evolved NodeB (eNodeB, eNB), a 5G node, a next-generation NodeB (gNB), a wireless point, a transmission/reception point (TRP), or other terms having equivalent technical meanings.

Each of the terminal 120 and the terminal 130 is used by a user and performs communication with the BS 110 on a radio channel. A link from the BS 110 to the terminal 120 or the terminal 130 is referred to as a downlink (DL), and a link from the terminal 120 or the terminal 130 to the BS 110 is referred to as an uplink (UL). In addition, the terminal 120 and the terminal 130 may perform communication with each other on a radio channel therebetween. In this case, the link between the terminal 120 and the terminal 130 may be referred to as a sidelink, which may be referred to as a PC5 interface. In some cases, at least one of the terminal 120 and the terminal 130 may be operated without user involvement. That is, at least one of the terminal 120 and the terminal 130 may be a device for performing machine-type communication (MTC), and may not be carried by a user. Each of the terminal 120 and the terminal 130 may be referred to as, in addition to 'terminal', 'UE', 'MS', 'subscriber station', 'remote terminal', 'wireless terminal', 'user device', or other terms having equivalent technical meanings.

The BS 110, the terminal 120, and the terminal 130 may transmit and receive radio signals in a millimeter-wave (mmWave) band (e.g., 28 GHz, 30 GHz, 38 GHz, or 60 GHz). In this case, in order to improve a channel gain, the BS 110, the terminal 120, and the terminal 130 may perform beamforming. Here, beamforming may include transmission beamforming and reception beamforming. That is, the BS 110, the terminal 120, and the terminal 130 may provide directivity to a transmission signal or a reception signal. To this end, the BS 110 and the terminals 120 and 130 may select serving beams 112, 113, 121, and 131 through a beam search or beam management procedure. After the serving beams 112, 113, 121, and 131 are selected, subsequent communication may be performed by using resources that are quasi co-located (QCL) with resources that transmit the serving beams 112, 113, 121, and 131.

It may be evaluated that a first antenna port and a second antenna port have a QCL relationship when large-scale properties of a channel over which a symbol on the first antenna port is conveyed can be inferred from a channel over which a symbol on the second antenna port is conveyed. For example, the large-scale properties may include at least one of delay spread, Doppler spread, Doppler shift, average gain, average delay, and spatial receiver parameters.

The terminal 120 and the terminal 130 illustrated in FIG. 1 may support vehicular communication. For vehicular communication, in an LTE system, standardization for vehicle-to-everything (V2X) technology has been completed in 3GPP Releases 14 and 15 based on a device-to-device (D2D) communication structure, and efforts are being made to develop V2X technology based on 5G NR. NR V2X will support terminal-to-terminal unicast communication, groupcast (or multicast) communication, and broadcast communication. In addition, unlike LTE V2X that aims to transmit and receive basic safety information required for road driving of a vehicle, NR V2X aims to provide more advanced services, such as platooning, advanced driving, extended sensors, and remote driving.

V2X services may be classified into basic safety services and advanced services. The basic safety services may include detailed services such as a vehicle notification (e.g., cooperative awareness messages (CAMs) or basic safety messages (BSMs)) service, a left-turn notification service, a front-car collision warning service, an emergency car access notification service, a front obstacle warning service, and an intersection traffic light information service, and V2X information may be transmitted or received by using a broadcast, unicast, or groupcast transmission scheme. The advanced services not only have enhanced quality of service (QoS) requirements compared to the basic safety services, but also require a method of transmitting or receiving V2X information by using unicast and groupcast transmission schemes in addition to a broadcast transmission scheme, so as to allow V2X information to be transmitted or received in a particular vehicle group or between two vehicles. The advanced services may include detailed services such as a platooning service, an autonomous driving service, a remote driving service, and an extended sensor-based V2X service.

Hereinafter, a sidelink (SL) refers to a signal transmission/reception path between terminals, and may be interchangeably used with a PC5 interface. Hereinafter, a BS is an entity that performs resource allocation of a terminal, and may be a BS supporting both V2X communication and general cellular communication, or a BS supporting only V2X communication. That is, the BS may refer to an NR BS (e.g., a gNB), an LTE BS (e.g., an eNB), or a road side unit (RSU). A terminal may include not only a general UE and MS, but also a vehicle supporting vehicle-to-vehicle (V2V) communication, a vehicle or a pedestrian handset (e.g., a smart phone) supporting vehicle-to-pedestrian (V2P) communication, a vehicle supporting vehicle-to-network (V2N) communication, a vehicle, an RSU equipped with terminal functions, an RSU equipped with BS functions, or an RSU equipped with some of BS functions and some of terminal functions, supporting vehicle-to-infrastructure (V2I) communication. In addition, a V2X terminal used in the following description may be referred to as a terminal. That is, in relation to V2X communication, a terminal may be used as a V2X terminal.

A BS and a terminal are connected to each other via a Uu interface. UL refers to a radio link through which a terminal transmits data or a control signal to a BS, and DL refers to a radio link through which a BS transmits data or a control signal to a terminal.

Figure 2:
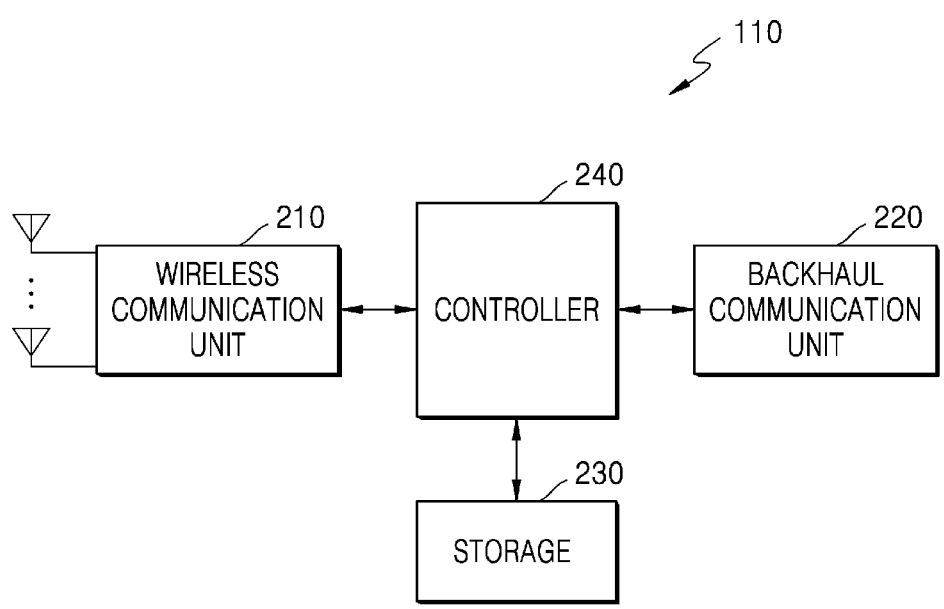
FIG. 2 illustrates a configuration of a base station in a wireless communication system, according to an embodiment of the present disclosure.

FIG. 2 illustrates a configuration of a BS in a wireless communication system, according to an embodiment of the present disclosure. The configuration illustrated in FIG. 2 may be understood as a configuration of a BS 110. The terms such as " . . . er (or)", " . . . unit", etc., used herein denote a unit that performs at least one function or operation, which may be implemented as hardware or software or a combination thereof.

Referring to FIG. 2, the BS 110 may include a wireless communication unit 210, a backhaul communication unit 220, a storage 230, and a controller 240. However, the components of the BS are not limited to the above-described examples. For example, the BS may include more or fewer components than the above-described components. Furthermore, the wireless communication unit 210, the backhaul communication unit 220, the storage 230, and the controller 240 may be implemented as a single chip. In addition, the controller 240 may include one or more processors.

The wireless communication unit 210 may perform functions for transmitting and receiving signals on a radio channel. For example, the wireless communication unit 210 may perform a function of converting between a baseband signal and a bit string according to a physical layer standard of a system. For example, upon transmission of data, the wireless communication unit 210 may encode and modulate a transmission bit string to generate complex symbols. Also, upon reception of data, the wireless communication unit 210 may reconstruct a reception bit string by demodulating and decoding a baseband signal.

The wireless communication unit 210 up-converts a baseband signal into a radio frequency (RF) band signal, transmits the RF band signal through an antenna, and down-converts an RF band signal received through an antenna into a baseband signal. To this end, the wireless communication unit 210 may include a transmission filter, a reception filter, an amplifier, a mixer, an oscillator, a digital-to-analog converter (DAC), an analog-to-digital converter (ADC), etc. In addition, the wireless communication unit 210 may include a plurality of transmission and reception paths. Furthermore, the wireless communication unit 210 may include at least one antenna array including a plurality of antenna elements.

In terms of hardware, the wireless communication unit 210 may include a digital unit and an analog unit, and the analog unit may include a plurality of sub-units according to operating power, an operating frequency, etc. The digital unit may be implemented as at least one processor (e.g., a digital signal processor (DSP)).

The wireless communication unit 210 transmits and receives a signal as described above. Accordingly, all or part of the wireless communication unit 210 may be referred to as 'transmitter', 'receiver', or 'transceiver'. Also, in the following description, transmission and reception performed on a radio channel are used to mean that the above-described processing is performed by the wireless communication unit 210.

The backhaul communication unit 220 provides an interface for performing communication with other nodes in a network. That is, the backhaul communication unit 220 converts a bit string transmitted from the BS 110 to another node, for example, another access node, another BS, a higher node, a core network, etc., into a physical signal, and converts a physical signal received from another node into a bit string.

The storage 230 stores data such as a basic program, an application program, and configuration information for operations of the BS 110. The storage 230 may include a volatile memory, a nonvolatile memory, or a combination of a volatile memory and a nonvolatile memory. In addition, the storage 230 may provide data stored therein at a request of the controller 240.

The controller 240 controls the overall operations of the BS 110. For example, the controller 240 transmits and receives a signal through the wireless communication unit 210 or the backhaul communication unit 220. Also, the controller 240 writes and reads data in and from the storage 230. In addition, the controller 240 may perform functions of a protocol stack required in a communication standard. In another implementation, the protocol stack may be included in the wireless communication unit 210. To this end, the controller 240 may include at least one processor. According to embodiments, the controller 240 may control the BS 110 to perform operations according to embodiments of the present disclosure, which are described below.

Figure 3:
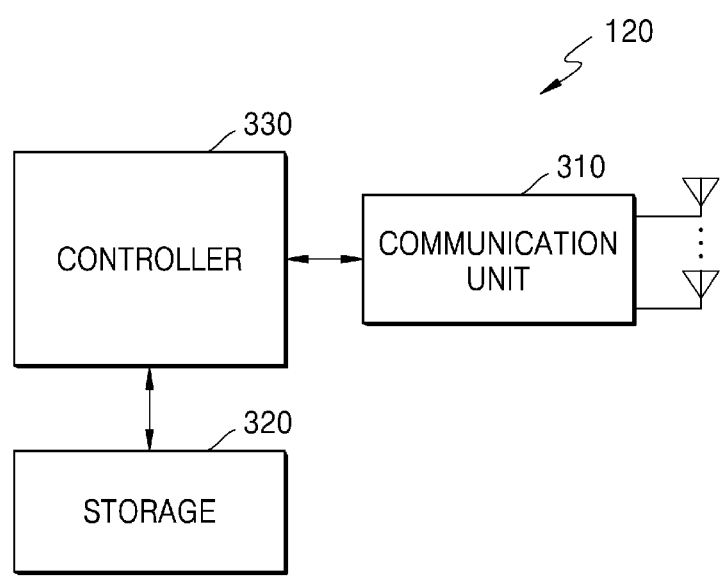
FIG. 3 illustrates a configuration of a terminal in a wireless communication system, according to an embodiment of the present disclosure.

FIG. 3 illustrates a configuration of a terminal in a wireless communication system, according to an embodiment of the present disclosure.

The configuration illustrated in FIG. 3 may be understood as a configuration of a terminal 120. The terms such as " . . . er (or)", " . . . unit", etc., used herein denote a unit that performs at least one function or operation, which may be implemented as hardware or software or a combination thereof.

Referring to FIG. 3, the terminal 120 may include a communication unit 310, a storage 320, and a controller 330. However, the components of the terminal 120 are not limited to the above-described examples. For example, the terminal 120 may include more or fewer components than the above-described components. Furthermore, the communication unit 310, the storage 320, and the controller 330 may be implemented as a single chip. In addition, the controller 330 may include one or more processors.

The communication unit 310 performs functions for transmitting and receiving signals on a radio channel. For example, the communication unit 310 performs a function of converting between a baseband signal and a bit string according to a physical layer standard of a system. For example, upon transmission of data, the communication unit 310 encodes and modulates a transmission bit string to generate complex symbols. Also, upon reception of data, the communication unit 310 reconstructs a reception bit string by demodulating and decoding a baseband signal. In addition, the communication unit 310 up-converts a baseband signal into an RF band signal, transmits the RF band signal through an antenna, and down-converts an RF band signal received through an antenna into a baseband signal. For example, the communication unit 310 may include a transmission filter, a reception filter, an amplifier, a mixer, an oscillator, a DAC, an ADC, etc.

In addition, the communication unit 310 may include a plurality of transmission and reception paths. Furthermore, the communication unit 310 may include at least one antenna array including a plurality of antenna elements. In terms of hardware, the communication unit 310 may include a digital circuit and an analog circuit (e.g., a radio-frequency integrated circuit (RFIC)). Here, the digital circuit and the analog circuit may be implemented as one package. In addition, the communication unit 310 may include a plurality of RF chains. Furthermore, the communication unit 310 may perform beamforming.

The communication unit 310 transmits and receives a signal as described above. Accordingly, all or part of the communication unit 310 may be referred to as 'transmitter', 'receiver', or 'transceiver'. Also, in the following description, transmission and reception performed on a radio channel are used to mean that the above-described processing is performed by the communication unit 310.

The storage 320 stores data such as a basic program, an application program, and configuration information for operations of the terminal 120. The storage 320 may include a volatile memory, a nonvolatile memory, or a combination of a volatile memory and a nonvolatile memory. In addition, the storage 320 may provide data stored therein at a request of the controller 330.

The controller 330 controls the overall operations of the terminal 120. For example, the controller 330 transmits and receives a signal through the communication unit 310. Also, the controller 330 writes and reads data in and from the storage 320. In addition, the controller 330 may perform functions of a protocol stack required in a communication standard. To this end, the controller 330 may include at least one processor or a microprocessor, or may be part of a processor. In addition, part of the communication unit 310 and the controller 330 may be referred to as a communication processor (CP). According to embodiments, the controller 330 may control the terminal 120 to perform operations according to embodiments of the present disclosure, which are described below.

Figure 4:
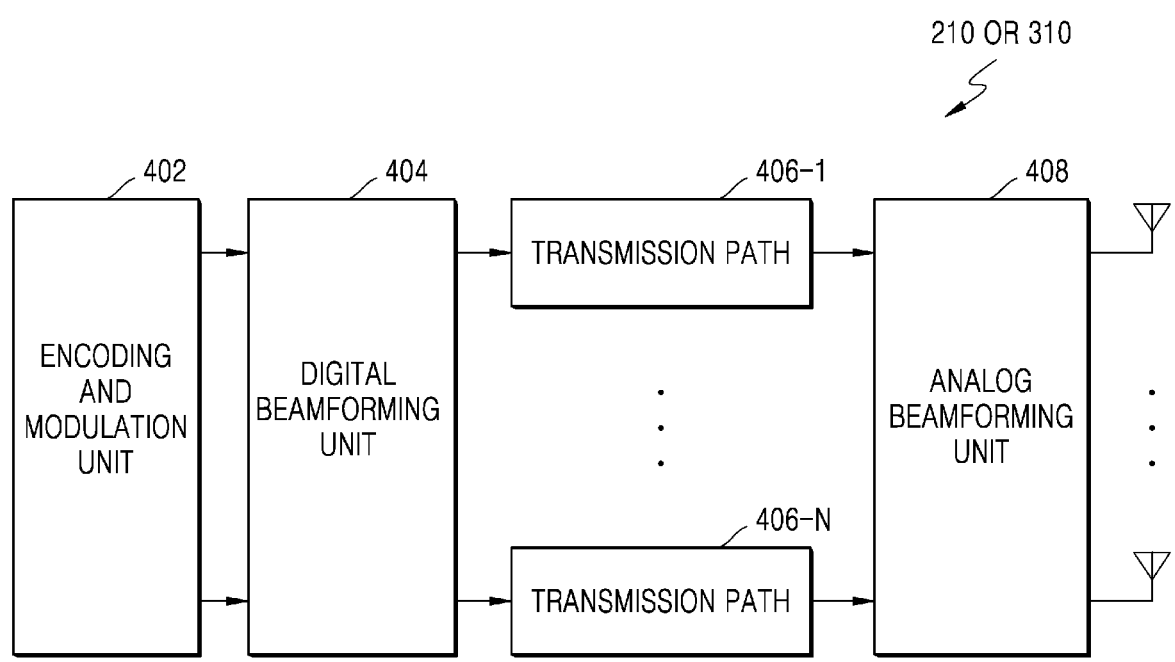
FIG. 4 illustrates a configuration of a communication unit in a wireless communication system, according to an embodiment of the present disclosure.

FIG. 4 illustrates a configuration of a communication unit in a wireless communication system, according to an embodiment of the present disclosure.

FIG. 4 illustrates an example of a detailed configuration of the wireless communication unit 210 of FIG. 2 or the communication unit 310 of FIG. 3. In detail, FIG. 4 illustrates components, which are parts of the wireless communication unit 210 of FIG. 2 or the communication unit 310 of FIG. 3, for performing beamforming.

Referring to FIG. 4, the wireless communication unit 210 or the communication unit 310 includes an encoding and modulation unit 402, a digital beamforming unit 404, a plurality of transmission paths 406-1 to 406-N, and an analog beamforming unit 408.

The encoding and modulation unit 402 performs channel encoding. For performing channel encoding, at least one of a low-density parity-check (LDPC) code, a convolution code, and a polar code may be used. The encoding and modulation unit 402 generates modulation symbols by performing constellation mapping.

The digital beamforming unit 404 performs beamforming on a digital signal (e.g., modulation symbols). To this end, the digital beamforming unit 404 multiplies the modulation symbols by beamforming weights. Here, the beamforming weights are used to change the magnitude and phase of a signal, and may be referred to as a precoding matrix, a precoder, etc. The digital beamforming unit 404 outputs digitally beamformed modulation symbols to the plurality of transmission paths 406-1 to 406-N. At this point, according to a multiple-input multiple-output (MIMO) transmission scheme, the modulation symbols may be multiplexed, or the same modulation symbols may be provided to the plurality of transmission paths 406-1 to 406-N.

The plurality of transmission paths 406-1 to 406-N convert digitally beamformed digital signals into analog signals. To this end, each of the plurality of transmission paths 406-1 to 406-N may include an inverse fast Fourier transform (IFFT) operator, a cyclic prefix (CP) inserter, a DAC, and an up-converter. The CP inserter is for an orthogonal frequency-division multiplexing (OFDM) scheme and may be excluded when a different physical layer scheme (e.g., a filter bank multi-carrier (FBMC) scheme) is applied. That is, the plurality of transmission paths 406-1 to 406-N provide independent signal processing for a plurality of streams generated through digital beamforming. However, according to an implementation scheme, some of the components of the plurality of transmission paths 406-1 to 406-N may be shared.

The analog beamforming unit 408 performs beamforming on an analog signal. To this end, the digital beamforming unit 404 multiplies analog signals by beamforming weights. Here, the beamforming weights are used to change the magnitude and phase of a signal. In detail, the analog beamforming unit 440 may be configured in various ways according to a connection structure between the plurality of transmission paths 406-1 to 406-N and antennas. For example, each of the plurality of transmission paths 406-1 to 406-N may be connected to one antenna array. As another example, the plurality of transmission paths 406-1 to 406-N may be connected to one antenna array. As another example, the plurality of transmission paths 406-1 to 406-N may be adaptively connected to one, two, or more antenna arrays.

Figure 5:
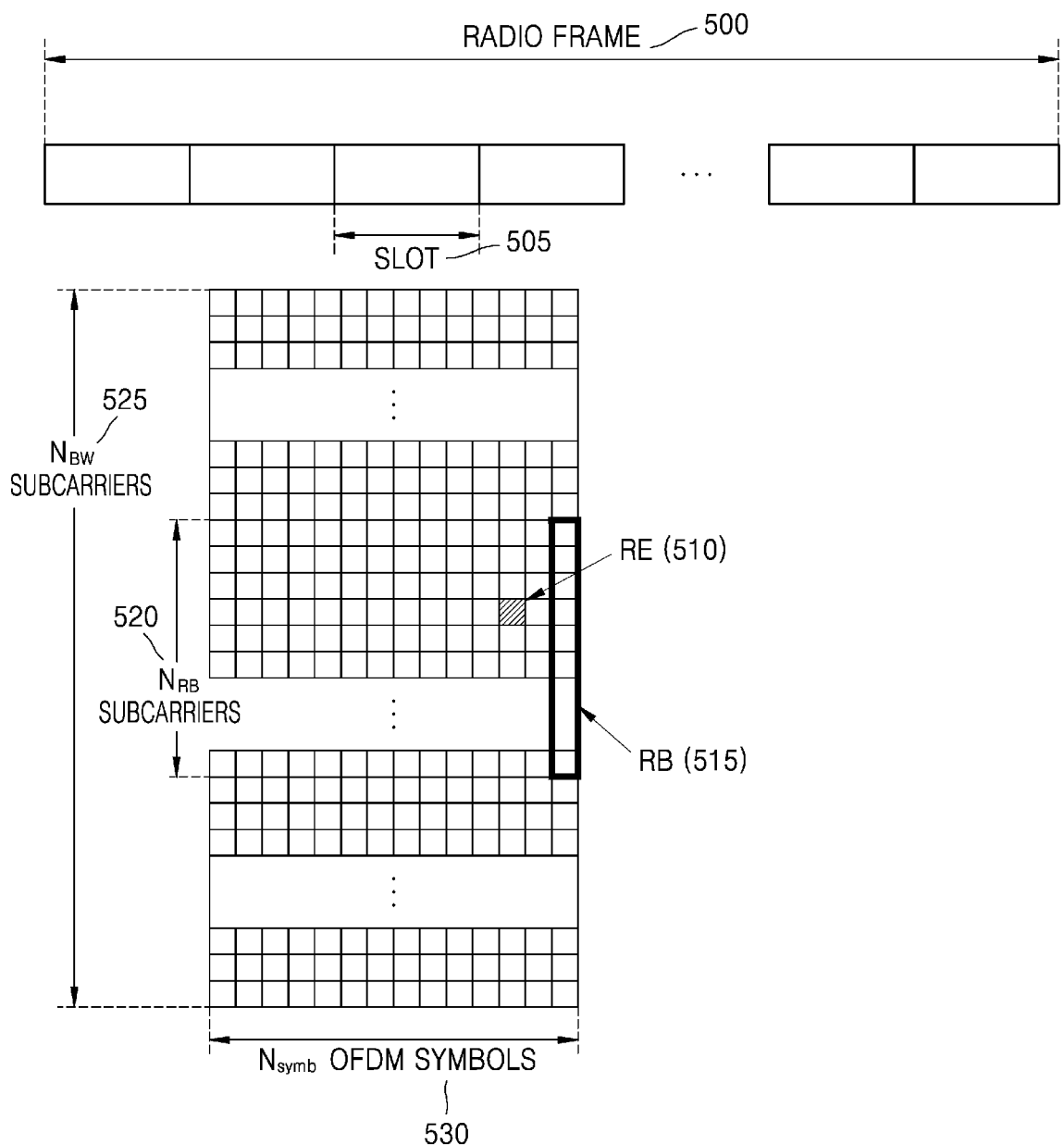
FIG. 5 illustrates a structure of radio time-frequency resources of a wireless communication system, according to an embodiment of the present disclosure.

FIG. 5 illustrates a structure of radio time-frequency resources of a wireless communication system, according to an embodiment of the present disclosure.

Referring to FIG. 5, in a radio resource domain, the horizontal axis represents a time domain, and the vertical axis represents a frequency domain. The minimum transmission unit in the time domain is an OFDM symbol or a discrete Fourier transform spread (DFT-S)-OFDM symbol, and Nsymb OFDM symbols or DFT-S-OFDM symbols 530 are included in one slot 505. Unlike the slot, the length of a subframe in an NR system may be defined as 1.0 ms, and the length of a radio frame 500 may be defined as 10 ms. The minimum transmission unit in the frequency domain is a subcarrier, and the entire system transmission bandwidth may include a total of NBW subcarriers 525. Specific values of Nsymb and NBW may be variably applied depending on the system.

The basic unit in the time-frequency resource domain is a resource element (RE) 510, which may be represented by an OFDM symbol index or a DFT-S-OFDM symbol index and a subcarrier index. A resource block (RB) 515 may be defined by NRB consecutive subcarriers 520 in the frequency domain. In general, the minimum transmission unit of data is an RB unit, and in the NR system, in general, Nsymb=14 and NRB=12.

The structure of the radio time-frequency resources illustrated in FIG. 5 is applied to a Uu interface. In addition, the structure of the radio time-frequency resources illustrated in FIG. 5 may be applied to an SL in a similar manner.

Figure 6A:
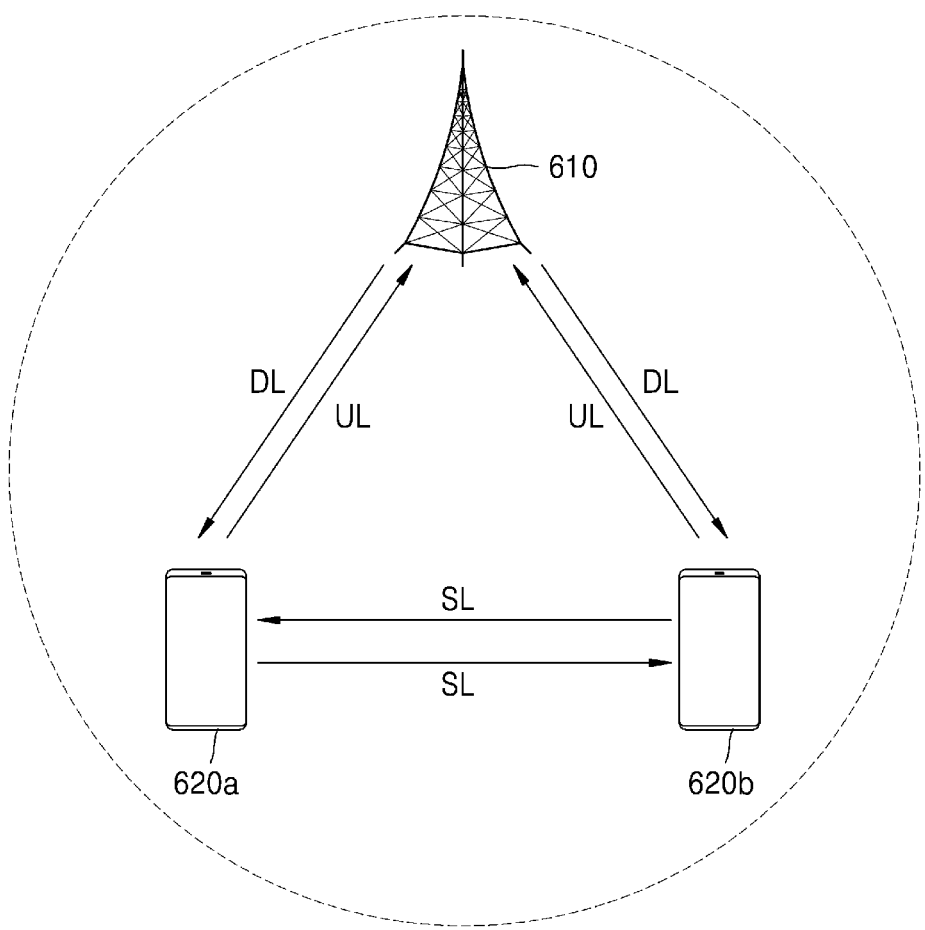
FIG. 6A is a diagram illustrating a scenario for sidelink communication according to an embodiment of the present disclosure.

FIG. 6A illustrates an example of a scenario for SL communication according to an embodiment of the present disclosure.

FIG. 6A illustrates an in-coverage scenario in which SL terminals 620a and 620b are located within the coverage of a BS 610. The SL terminals 620a and 620b may receive data and control information from the BS 610 through a DL, or may transmit data and control information to the BS 610 through a UL. In this case, the data and control information may be for SL communication, or may be for cellular communication rather than SL communication. In addition, in FIG. 6A, the SL terminals 620a and 620b may transmit and receive data and control information for SL communication through SLs.

Figure 6B:
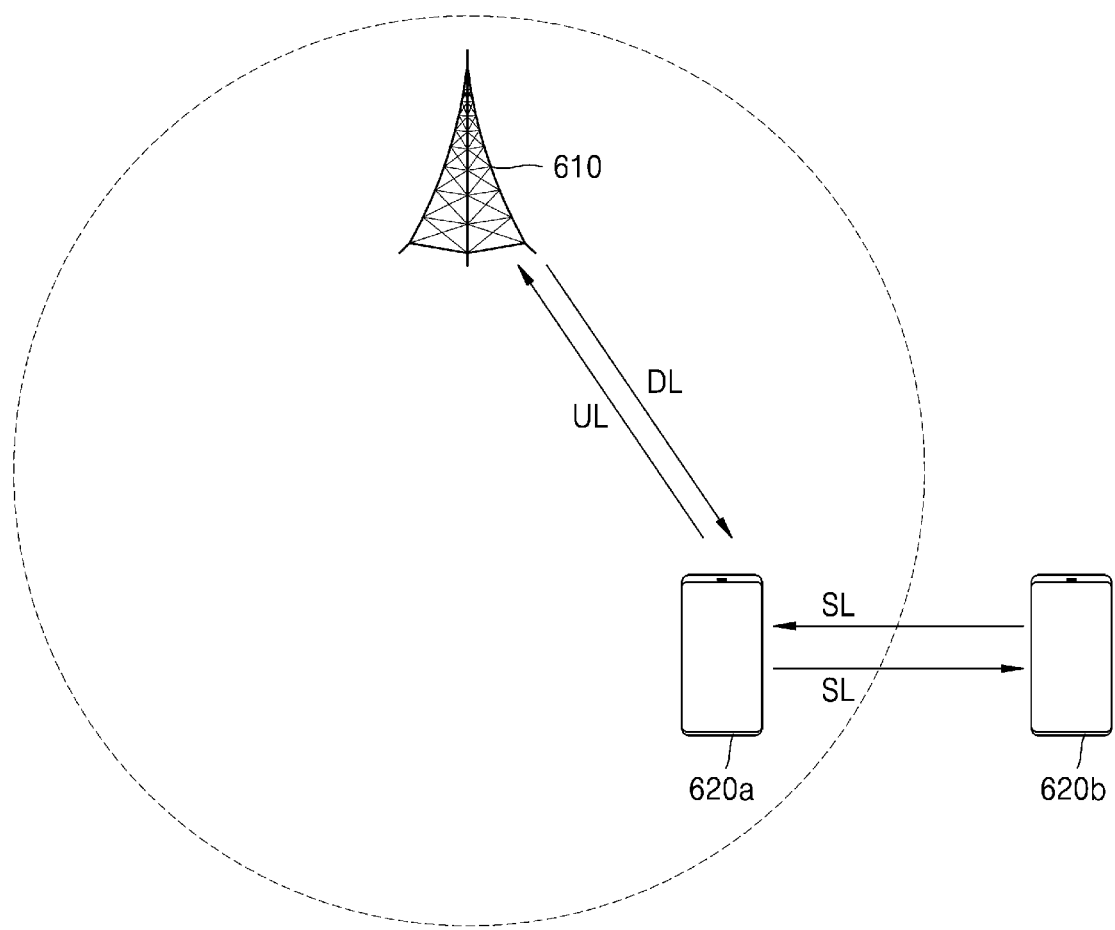
FIG. 6B is a diagram illustrating a scenario for sidelink communication according to an embodiment of the present disclosure.

FIG. 6B illustrates an example of a scenario for SL communication in a wireless communication system, according to an embodiment of the present disclosure.

FIG. 6B illustrates partial coverage in which the first SL terminal 620a of the SL terminals is located within the coverage of the BS 610 and the second SL terminal 620b is located outside the coverage of the BS 610. The first SL terminal 620a located within the coverage of the BS 610 may receive data and control information from the BS 610 through a DL, or may transmit data and control information to the BS 610 through a UL. The second SL terminal 620b located outside the coverage of the BS 610 is unable to receive data and control information from the BS 610 through a DL, and is unable to transmit data and control information to the BS 610 through a UL. The second SL terminal 620b may transmit and receive data and control information for SL communication to and from the first terminal 610a through an SL.

Figure 6C:
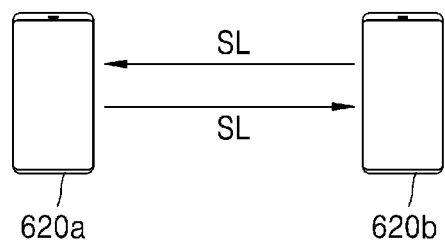
FIG. 6C is a diagram illustrating a scenario for sidelink communication according to an embodiment of the present disclosure.

FIG. 6C illustrates an example of a scenario for SL communication in a wireless communication system, according to an embodiment of the present disclosure.

FIG. 6C illustrates an example in which SL terminals (e.g., the first SL terminal 610a and the second SL terminal 620b) are located outside the coverage of a BS. Therefore, the first SL terminal 620a and the second SL terminal 620b are unable to receive data and control information from the BS through a DL, and are unable to transmit data and control information to the BS through a UL. The first SL terminal 620a and the second SL terminal 620b may transmit and receive data and control information for SL communication through SLs.

FIG. 6D illustrates an example of a scenario for SL communication in a wireless communication system, according to an embodiment of the present disclosure.

Referring to FIG. 6D, the first SL terminal 620a and the second SL terminal 620b, which perform SL communication, may perform inter-cell SL communication in a state in which they are connected to different BSs (e.g., a first BS 610a and a second BS 610b) (e.g., an RRC-connected state) or they are camped on the BSs (e.g., an RRC-disconnected state, i.e., an RRC-idle state). In this case, the first terminal 620a may be an SL transmitting terminal, and the second terminal 620b may be an SL receiving terminal. Alternatively, the first terminal 620a may be an SL receiving terminal, and the second terminal 620b may be an SL transmitting terminal. The first terminal 620a may receive an SL-dedicated system information block (SIB) from the BS 610a to which the first terminal 620a has accessed (or on which the first terminal 620a camps), and the second terminal 620b may receive an SL-dedicated SIB from another BS 610b to which the second terminal 620b has accessed (or on which the second terminal 620b camps). In this case, information of the SL-dedicated SIB received by the first terminal 620a, may be different from information of the SL-dedicated SIB received by the second terminal 620b. Accordingly, it is necessary to unify the information in order to perform SL communication between the terminals located in different cells.

Although the examples of SL systems configured with two terminals (e.g., the first SL terminal 620a and the second SL terminal 620b) have been described with reference to FIGS. 6A to 6D for convenience of description, the present disclosure is not limited thereto, and may be applied to an SL system in which three or more terminals participate. In addition, ULs or DLs between the BSs 610, 610a, and 610b and the SL terminals 620a and 620b may be referred to as Uu interfaces, and an SL between the SL terminals may be referred to as a PC-5 interface. In the following description, the terms 'UL', 'DL', 'Uu interface', 'SL', and 'PC-5' may be used interchangeably with each other.

Meanwhile, in the present disclosure, the term 'terminal' may refer to a vehicle supporting V2V communication, a vehicle or a pedestrian handset (e.g., a smart phone) supporting V2P communication, a vehicle supporting V2N communication, or a vehicle supporting V2I communication. In addition, in the present disclosure, the term 'terminal' may refer to an RSU equipped with terminal functions, an RSU equipped with BS functions, or an RSU equipped with some of BS functions and some of terminal functions.

Figure 7A:
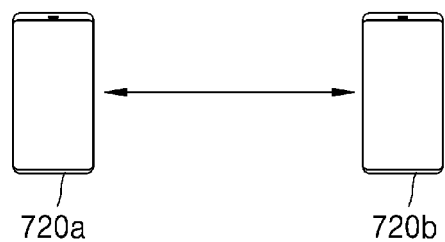
FIG. 7A is a diagram for describing a transmission scheme of sidelink communication according to an embodiment of the present disclosure.
Figure 7B:
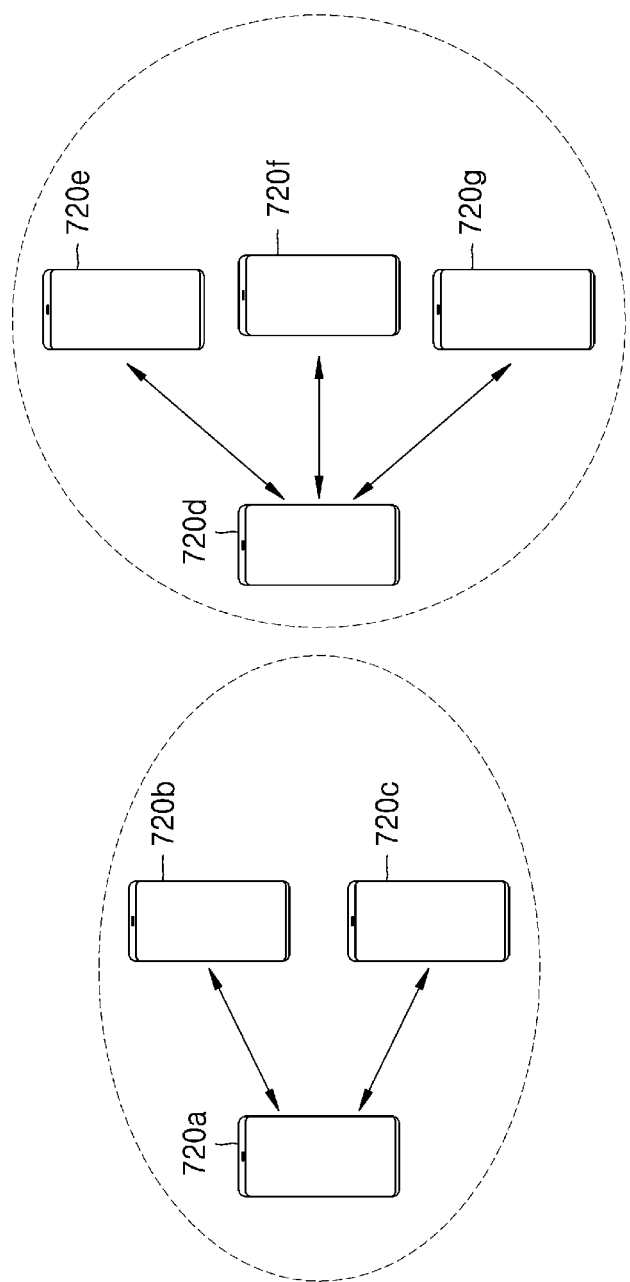
FIG. 7B is a diagram for describing transmission of sidelink communication according to an embodiment of the present disclosure.

FIGS. 7A and 7B are diagrams for describing transmission schemes of SL communication according to an embodiment of the present disclosure.

In detail, FIG. 7A illustrates a unicast scheme, and FIG. 7B illustrates a groupcast scheme.

Referring to FIG. 7A, a transmitting terminal 720a and a receiving terminal 720b may perform one-to-one communication. The transmission scheme illustrated in FIG. 7A may be referred to as unicast communication. Referring to FIG. 7B, a transmitting terminal 720a or 720d and receiving terminals 720b, 720c, 720e, 720f, and 720g may perform one-to-many communication. The transmission scheme illustrated in FIG. 7B may be referred to as groupcast or multicast. In FIG. 7B, the first terminal 720a, the second terminal 720b, and the third terminal 720c constitute one group and perform groupcast communication, and the fourth terminal 720d, the fifth terminal 720e, the sixth terminal 720f, and the seventh terminal 720g constitute another group and perform groupcast communication. The terminals may perform groupcast communication within the group to which they belong, and may perform unicast, groupcast, or broadcast communication with at least one other terminal belonging to other group. Although FIG. 7B illustrates two groups for convenience of description, the present disclosure is not limited thereto, and may be applied to a case in which a larger number of groups are formed.

Although not illustrated in FIG. 7A or 7B, SL terminals may perform broadcast communication. The term 'broadcast communication' refers to a scheme in which all SL terminals receive data and control information transmitted by an SL transmitting terminal through an SL. For example, in FIG. 7B, when the first terminal 720a is a transmitting terminal, the other terminals 720b, 720c, 720d, 720e, 720f, and 720g may receive data and control information transmitted by the first terminal 720a.

SL unicast communication, groupcast communication, and broadcast communication described above may be supported in an in-coverage scenario, a partial-coverage scenario, or an out-of-coverage scenario.

In the case of an NR SL, unlike in an LTE SL, the support for a transmission scheme in which a vehicle terminal transmits data to only one particular terminal through unicast communication, and a transmission scheme in which a vehicle terminal transmits data to a plurality of particular terminals through groupcast communication may be considered. For example, unicast and groupcast techniques may be usefully applied to the case of a service scenario such as platooning in which two or more vehicles are connected to a single network and move together in a cluster. In detail, unicast communication may be used for a leader terminal in a group connected by platooning to control one particular terminal, and groupcast communication may be used for the leader terminal to simultaneously control the group including a plurality of particular terminals.

The following methods may be used for resource allocation in a V2X system:

(1) Mode 1 Resource Allocation

Scheduled resource allocation is a method in which a BS allocates resources to be used for SL transmission to RRC-connected terminals in a dedicated scheduling scheme. The scheduled resource allocation method may be effective for interference management and resource pool management (dynamic allocation and/or semi-persistent transmission) because the BS is able to manage the resources of the SL. When a terminal in an RRC-connected mode has data to be transmitted to other terminal(s), the terminal may transmit, to a BS, information indicating that there is data to be transmitted to other terminal(s) by using an RRC message or a MAC CE. For example, the RRC message that the terminal transmits to the BS may be an SL terminal information message (SidelinkUEInformation) or a terminal assistance information message (UEAssistanceInformation), and the MAC CE may correspond to a buffer status report (BSR) MAC CE, a scheduling request (SR), or the like including at least one of an indicator indicating a BSR for V2X communication and information about the size of data buffered for SL communication.

(2) Mode 2 Resource Allocation

Secondly, UE autonomous resource selection is a method in which SL transmission/reception resource pools for V2X are provided to a terminal by using system information or an RRC message (e.g., an RRCReconfiguration message or a PC5-RRC message), and the terminal selects a resource pool and resources according to a predefined rule. The UE autonomous resource selection may correspond to one or more of the following resource allocation methods:

The terminal autonomously selects SL resources for transmission.

The terminal assists SL resource selection for other terminals.

The terminal is configured with an NR-configured grant for SL transmission.

The terminal may schedule SL transmission of other terminals.

Resource selection methods for the terminal may include zone mapping, sensing-based resource selection, random selection, and the like.

In addition, even when the terminal is located in the coverage of the BS, resource allocation or resource selection may not be performed according to the scheduled resource allocation or UE autonomous resource selection mode, and in this case, the terminal may perform V2X SL communication through a preconfigured SL transmission/reception resource pool.

Furthermore, when the terminals for V2X communication are located outside the coverage of the BS, the terminals may perform V2X SL communication through a preconfigured SL transmission/reception resource pool.

A terminal may transmit and receive data to and from another terminal on one or more SL carriers. Data transmission and reception through an SL carrier may include at least one of a unicast scheme, a groupcast scheme, and a broadcast scheme. Data transmission and reception through one or more SL carriers may include multicarrier transmission in which different packets are transmitted and received through respective carriers. Data transmission and reception through one or more SL carriers may include duplication transmission (packet duplication) in which the same packet is transmitted and received through one or more carriers. For example, duplication transmission may refer to an operation of transmitting the same PDCP packet on one or more SL carriers. When duplication transmission of a packet is performed an SL PDCP entity may be associated with a plurality of SL radio link control (RLC) entities, and the same PDCP PDU may be transmitted and received via an SL logical channel of each RLC entity.

An SL duplication transmission operation in which a terminal transmits and receives the same PDCP packet to and from another terminal on one or more carriers will be described with reference to the following various embodiments.

SL duplication transmission according to an embodiment of the present disclosure may be configured for at least one of PC5-RRC and PC5-S signaling corresponding to an SL signaling bearer, and PC5 data corresponding to an SL data bearer. SL duplication transmission may be configured for a packet transmitted and received in at least one scheme of SL unicast, SL groupcast, and SL broadcast. Information for configuring duplication transmission for an SL bearer of a certain type (e.g., signaling, data) and/or an SL transmission scheme of a certain type (e.g., unicast, groupcast, broadcast) may be obtained by the terminal from at least one of dedicated RRC signaling, SIB signaling, or a preconfiguration transmitted by a network.

According to an embodiment of the present disclosure, the terminal may obtain SL duplication transmission configuration information. The SL duplication transmission configuration information that may be obtained by the terminal may include at least one or a combination of information in Table 1 below.

TABLE 1 carrier list to be used for sidelink duplication transmission, sidelink signaling bearer to which sidelink duplication transmission is to be applied, sidelink data bearer to which sidelink duplication transmission is to be applied, sidelink logical channel group to which sidelink TABLE 1-continued duplication transmission is to be applied, sidelink destination address
to which sidelink duplication transmission is to be applied, sidelink
transmission type (unicast/groupcast/broadcast) to which sidelink
duplication transmission is to be applied, sidelink flow to which
sidelink duplication transmission is to be applied, unicast link to which
sidelink duplication transmission is to be applied, information of
criterion of activation of sidelink duplication transmission, information
of criterion of deactivation of sidelink duplication transmission Criterion parameters for activating or deactivating SL duplication transmission may include at least one or a combination of information in Table 2 below.

TABLE 2 reliability, priority, HARQ feedback (number of consecutive NAKs), CBR
(channel busy ratio), PRR (packet reception ratio)

Among the criterion parameters of Table 2, the reliability or priority may be configured for an SL radio bearer (SLRB), an SL flow, an SL unicast link, PC5-RRC, PC5-S signaling, an SL logical channel, and an SL logical channel group. The reliability or priority may correspond to a parameter configured by the network for the terminal, based on an SLRB, an SL flow, a QoS requirement of an SL unicast link, and a PQI.

The criterion parameters for activation/deactivation of SL duplication transmission may be identically or differently configured according to the RRC state, the SL transmission type, an SL unicast link, an SL destination identifier, an SL PC5-RRC bearer, an SL PC5-S bearer, an SL bearer identifier, an SL flow identifier, an SL logical channel group identifier, and an SL logical channel identifier of the terminal for which SL duplication transmission is configured.

SL parameters to which the criterion parameters of activation/deactivation for SL duplication transmission is applied may include, as configuration information, at least one or a combination of an SL unicast link, an SL signaling bearer, an SL data bearer, an SL flow, an SL logical channel group, an SL logical channel, and an SL destination. For example, the terminal or the network may determine whether to activate/deactivate duplication transmission by comparing thresholds for the criterion parameters (reliability, priority, hybrid automatic repeat request (HARQ) feedback, channel busy ratio (CBR), packet reception ratio (PRR)) with the criterion parameters of the SL parameters (a unicast link, a signaling bearer, a data bearer, a flow, a logical channel group, a logical channel, an SL destination).

The terminal may obtain SL duplication transmission configuration information including at least one or a combination of the parameters in Table 1 and Table 2 through at least one of dedicated RRC signaling or a system information message, and a preconfiguration transmitted by the network.

A method of activating or deactivating SL duplication transmission according to an embodiment of the present disclosure includes (1), (2), (3), (4), and (5) below.

(1) According to an embodiment of the present disclosure, the terminal may perform an operation of configuring SL duplication transmission and determining activation or deactivation, based on SL duplication transmission configuration information of Tables 1 and 2.

(2) According to an embodiment of the present disclosure, the network may configure SL duplication transmission, determine activation or deactivation, and provide the terminal with SL duplication transmission configuration information of Table 1 including the configured and determined information.

(3) According to an embodiment of the present disclosure, the network may configure SL duplication transmission or configure an activation criterion or a deactivation criterion, and provide the terminal with SL duplication transmission configuration information of Tables 1 and 2 including the configured information. The terminal that has obtained the SL duplication transmission configuration information may perform an operation of determining an activation criterion or a deactivation criterion and determining whether to activate or deactivate of SL duplication transmission.

(4) When it is determined that a condition of SL duplication transmission is satisfied, the terminal may obtain configuration information for SL duplication transmission from the network. The condition of SL duplication transmission may be configured based on the parameters of Table 2. The SL duplication transmission configuration information may include Table 1. When the terminal is in RRC_CONNECTED state, the terminal may request the SL duplication transmission configuration information from the network. When the terminal is in RRC_IDLE state or RRC_INACTIVE state, the terminal may obtain the SL duplication transmission configuration information from system information transmitted by the network. When the terminal is in an out-of-coverage (OOC) state, the terminal may obtain preconfigured SL duplication transmission configuration information. In the case of SL unicast, when it is determined that the condition of SL duplication transmission is satisfied, the terminal may request SL duplication transmission from a counterpart terminal. The condition of SL duplication transmission may be configured based on the parameters of Table 2.

The condition of SL duplication transmission may include at least one or a combination of conditions in Table 3.

TABLE 3

| | |
|---|---|
| (i) | It is determined that there are consecutive X HARQ NAKs |
| (ii) | It is determined that the packet reception ratio (PRR) is less than reference value A |
| (iii) | It is determined that the PRR is less than reference value A for preset period of time Y |
| (iv) | It is determined that the channel busy ratio (CBR) of the serving carrier is greater than reference value B |
| (v) | It is determined that the CBR of the serving carrier is greater than reference value B for preset period of time Z |
| (vi) | It is determined that at least one or a combination of (i) to (v) is satisfied for a bearer that requires reliability greater than or equal to reference value C (in the present disclosure, it is assumed that the transmission reliability increases as the reliability increases, and it is possible to determine duplication transmission for a bearer (or a flow or a unicast link) requiring transmission reliability greater than a transmission reliability reference value) |
| (vii) | It is determined that at least one or a combination of (i) to (v) is satisfied for a bearer that requires priority greater than or equal to reference value D (in the present disclosure it is assumed that the transmission reliability increases as the priority increases, and it is possible to determine duplication transmission for a bearer (or a flow or a unicast link) requiring transmission reliability greater than a transmission reliability reference value) |

(5) When it is determined that a condition of activation or deactivation of SL duplication transmission is satisfied, the terminal may request the network to activate or deactivate SL duplication transmission. The condition of SL duplication transmission may be configured based on the parameters of Table 2. (5) may correspond to a terminal in RRC_CONNECTED state. In the case of SL unicast, when it is determined that the condition of activation or deactivation of SL duplication transmission is satisfied, the terminal may request the counterpart terminal to activate or deactivate SL duplication transmission. The condition of SL duplication transmission may be configured based on the parameters of Table 2. The condition of SL duplication transmission may include at least one or a combination of the conditions in Table 3.

According to an embodiment of the present disclosure, an SL communication system may apply at least one or a combination of (1), (2), (3), (4), and (5) described above. In addition, the terminal and the network may be configured such that the terminal applies at least one of (1), (2), and (3) according to a connection state with the BS (e.g., RRC_CONNECTED, RRC_IDLE/RRC_INACTIVE, OUT_OF_COVERAGE (OOC)), an SL communication scheme (e.g., unicast, groupcast, broadcast), an SL bearer type (e.g., a PC5-RRC signaling bearer, a PC5-S signaling bearer, a data bearer), or an SL resource scheduling mode (e.g., a BS scheduling mode, a terminal direct scheduling mode). That is, the terminal and the network may perform an SL duplication transmission processing operation based on at least one or a combination of (1), (2), and (3) according to the configuration of the SL communication system.

Figure 8A:
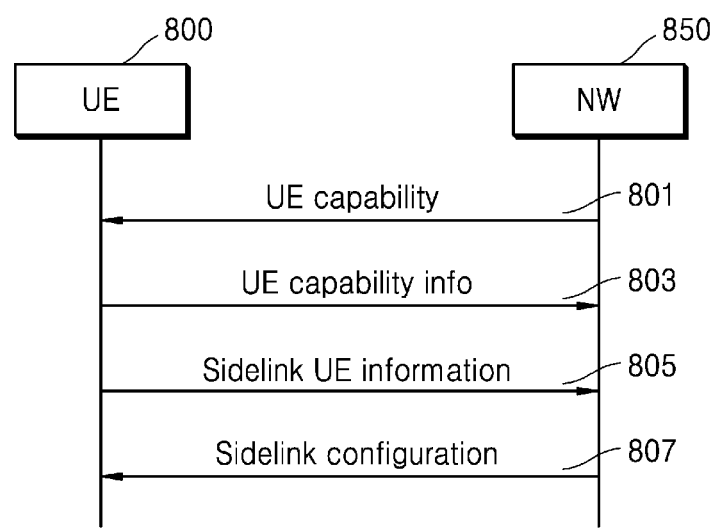
FIG. 8A is a flowchart illustrating an operation of processing sidelink duplication transmission when a terminal is in a radio resource control (RRC)-connected state, according to an embodiment of the present disclosure.
Figure 8B:
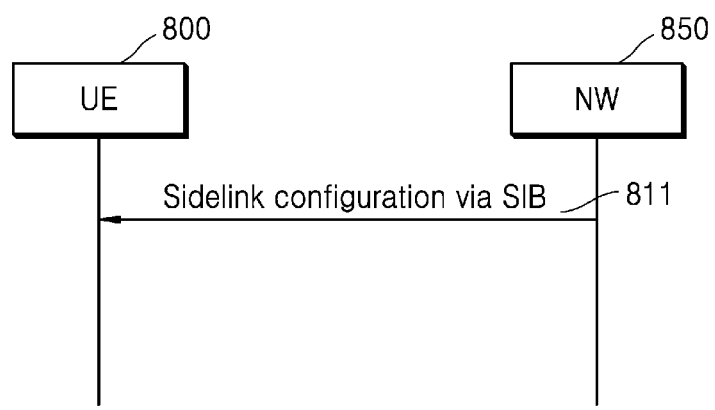
FIG. 8B is a flowchart illustrating an operation of processing sidelink duplication transmission when a terminal is in RRC IDLE or RRC INACTIVE state, according to an embodiment of the present disclosure.
Figure 8C:
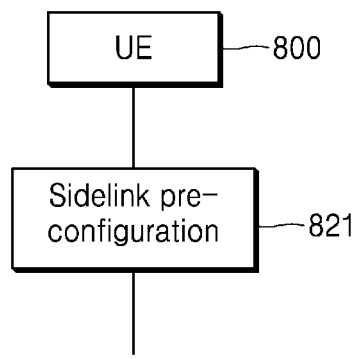
FIG. 8C is a flowchart illustrating an operation of processing sidelink duplication transmission when a terminal is in an out-of-coverage (OOC) state, according to an embodiment of the present disclosure.

FIGS. 8A to 8C are diagrams illustrating operations, performed by a UE, of processing SL duplication transmission, according to an embodiment of the present disclosure.

FIG. 8A illustrates an operation of processing configuration information of SL duplication transmission when the UE is in RRC_CONNECTED state. Referring to FIG. 8A, a UE 800 may transmit and receive signaling with a network 850 (hereinafter, referred to as the NW 850) in RRC_CONNECTED state.

In operation 801, the NW 850 may transmit a UE capability enquiry message to the UE 800. In operation 803, in response to the UE capability enquiry, the UE 800 may transmit a message including UE capability information to the NW 850. According to an embodiment of the present disclosure, the UE capability information message of operation 803 may include UE capability information related to SL duplication transmission. The UE capability information may include at least one or a combination of SL carrier frequency information supportable by the UE 800, SL band combination information, information about the number of carriers simultaneously transmittable by the UE 800, information about SL band combinations simultaneously transmittable by the UE 800, information about the number of carriers simultaneously receivable by the UE 800, and information about SL band combinations simultaneously receivable by the UE 800. Table 4 shows an embodiment of UE capability information related to execution of SL duplication transmission.

TABLE 4

```
SupportedBandCombination          ::=  SEQUENCE  (SIZE  (1..maxBandComb))  OF
BandCombinationParameters
BandCombinationParameters ::=  SEQUENCE {
    sl-SupportedTxBandCombListPerBC         BIT STRING (SIZE (1.. maxBandComb))
        OPTIONAL,
    sl-SupportedRxBandCombListPerBC         BIT STRING (SIZE (1.. maxBandComb))
        OPTIONAL
}
SL-Parameters ::=              SEQUENCE {
    sl-SupportedBandCombinationList        sl-SupportedBandCombination
        OPTIONAL
}
sl-SupportedBandCombination ::=         SEQUENCE  (SIZE  (1..maxBandComb))  OF  sl-
BandCombinationParameters
sl-BandCombinationParameters  ::=       SEQUENCE(SIZE(1..maxSimultaneousBands))OF
sl-BandParameters
sl-BandParameters ::= SEQUENCE {
    v2x-FreqBand              FreqBandIndicator,
    bandParametersTxSL        BandParametersTxSL  OPTIONAL,
    bandParametersRxSL        BandParametersRxSL  OPTIONAL
}
BandParametersTxSL ::= SEQUENCE {
    sl-BandwidthClassTxSLsl-BandwidthClassSL,
}
BandParametersRxSL ::= SEQUENCE {
    sl-BandwidthClassRxSLsl-BandwidthClassSL,
}
sl-BandwidthClassSL   ::=  SEQUENCE  (SIZE  (1..maxBandwidthClass))  OF  V2X-
BandwidthClass
sl-BandwidthClass ::= ENUMERATED {a, b, c, d, e, f, c1-v1530}
SL-Parameters-2 ::= SEQUENCE {
    sl-SupportedBandCombinationList-2      sl-SupportedBandCombination-2
        OPTIONAL
}
sl-SupportedBandCombination-2 ::=       SEQUENCE  (SIZE  (1..maxBandComb))  OF  sl-
BandCombinationParameters-2
sl-BandCombinationParameters-2 ::=      SEQUENCE(SIZE(1..maxSimultaneousBands))OF
sl-BandParameters-2
(Description of parameters)
sl-SupportedTxBandCombListPerBC, sl-SupportedRxBandCombListPerBC:
for a particular band combination, the supported band combination list among sl-
SupportedBandCombinationList on which the UE supports simultaneous transmission or
reception of Uu and sidelink communication respectively. The first bit refers to the first band
indicated by sl-SupportedBandCombinationList, with value 1 indicating sidelink
transmission/reception is supported.
sl-SupportedBandCombinationList:
the bands on which the UE supports sidelink communication. If a UE supports sidelink
```

TABLE 4-continued communication, the UE shall support a maximum number of N sidelink processes associated
with the Sidelink HARQ Entity for the transmission of sidelink communication on SL-SCH.

```
PDCP-Parameters ::=          SEQUENCE {
   pdcp-DuplicationSL-SRB  ENUMERATED {supported}   OPTIONAL,
   pdcp-DuplicationSL-DRB  ENUMERATED {supported}   OPTIONAL,
   ...
}
PDCP-Parameters ::=          SEQUENCE {
   pdcp-DuplicationSL-RRC    ENUMERATED {supported}   OPTIONAL,
   pdcp-DuplicationSL-PC5-S  ENUMERATED {supported}   OPTIONAL,
   pdcp-DuplicationSL-DRB    ENUMERATED {supported}   OPTIONAL,
   ...
}
```

In operation 805, the UE 800 may transmit, to the NW 850, an SidelinkUEInformation message including at least one or a combination of an SL service of interest, an SL unicast flow, and QoS information of the SL flow. In operation 807, the NW 850 may transmit, to the UE 800, an SL configuration message including SL radio bearer configuration information, in response to the SidelinkUEInformation message. The SL configuration message may include SL duplication transmission information according to an embodiment of the present disclosure. The SL duplication transmission information according to an embodiment of the present disclosure may include at least one or a combination of duplication transmission configuration information and activation and deactivation configuration information for SL duplication transmission. According to an embodiment of the present disclosure, the SL duplication transmission information may include at least one or a combination of configuration information for SL duplication transmission and activation or deactivation indication information of SL duplication transmission. When the SL duplication transmission information is included in the SL configuration message received in operation 807, the UE 800 may determine that SL duplication transmission may be performed, based on at least one of the SL duplication transmission configuration information, the activation and deactivation configuration information, and the activation and deactivation indication information.

FIG. 8B is a flowchart illustrating an operation of processing SL duplication transmission when the UE is in RRC IDLE or RRC INACTIVE state, according to an embodiment of the present disclosure.

Referring to FIG. 8B, in operation 811, the UE 800 in RRC_IDLE state or RRC_INACTIVE state may obtain SL duplication transmission information through system information transmitted by the NW 850. The SL duplication transmission information according to an embodiment of the present disclosure may include at least one or a combination of duplication transmission configuration information and activation and deactivation configuration information for SL duplication transmission. According to an embodiment of the present disclosure, the SL duplication transmission information may include at least one or a combination of configuration information for SL duplication transmission and activation or deactivation indication information of SL duplication transmission. When the SL duplication transmission information is included in the SL configuration received in operation 811, the UE 800 may determine that SL duplication transmission may be performed, based on at least one of the SL duplication transmission configuration information, the activation and deactivation configuration information, and the activation and deactivation indication information.

FIG. 8C is a flowchart illustrating an operation of processing SL duplication transmission when the UE is in an OOC state, according to an embodiment of the present disclosure.

Referring to FIG. 8C, in operation 821, the UE 800 in an OOC state may obtain SL duplication transmission information from preconfigured SL preconfiguration information. The SL duplication transmission information according to an embodiment of the present disclosure may include at least one or a combination of duplication transmission configuration information and activation and deactivation configuration information for SL duplication transmission. According to an embodiment of the present disclosure, the SL duplication transmission information may include at least one or a combination of configuration information for SL duplication transmission and activation or deactivation indication information of SL duplication transmission. When the SL duplication transmission information is included in the SL configuration obtained in operation 821, the UE 800 may determine that SL duplication transmission may be performed, based on at least one of the SL duplication transmission configuration information, the activation and deactivation configuration information, and the activation and deactivation indication information.

In addition, the SL duplication transmission information included in the SL configuration may include Table 5 below. Table 5 may include at least one or a combination of an SL duplication transmission activation or deactivation criterion parameter, a duplication transmission activation or deactivation criterion parameter for each of SL data and SL signaling, an SL duplication transmission carrier, and mapping information between the SL duplication transmission carrier and an SL bearer.

TABLE 5

```
SL-DuplicationConfig ::=         SEQUENCE {
   threshSL-Reliability           SL-Reliability,
   threshSL-Reliability-SRB       SL-Reliability,              OPTIONAL,
   allowedCarrierFreqConfig       SL-Reliability-CarrierFreqList  OPTIONAL,  --
Need OR
   ...
}
```

TABLE 5-continued

| | |
|---|---|
| SL-Reliability-CarrierFreqList ::= | SEQUENCE (SIZE (1..maxNrofSLRB)) OF SL-Reliability-RB-CarrierFreq |
| SL-Reliability-RB-CarrierFreq ::= | SEQUENCE { |
| slRBList | SL-SLRBList       OPTIONAL, |
| allowedCarrierFreqList | SL-AllowedCarrierFreqList     OPTIONAL, |
| } | |
| SL-AllowedCarrierFreqList ::= | SEQUENCE { |
| allowedCarrierFreqSet1 | SEQUENCE (SIZE (1..maxFreqV2X)) OF ARFCN-ValueNR, |
| allowedCarrierFreqSet2 | SEQUENCE (SIZE (1..maxFreqV2X)) OF ARFCN-ValueNR, |
| ... | |
| allowedCarrierFreqSetN | SEQUENCE (SIZE (1..maxFreqV2X)) OF ARFCN-ValueNR |
| // If present, NGRAN shall ensure allowedCarrierFreqSet1 and allowedCarrierFreqSet2 do not include the same carrier frequency. | |
| } | |

The SL duplication transmission information included in the SL configuration may include Table 6 below. Table 6 may include at least one or a combination of an SL duplication transmission activation or deactivation criterion parameter, an SL duplication transmission carrier, mapping information between the SL duplication transmission carrier and an SL destination.

and the SL radio bearer. According to an embodiment of the present disclosure, when the duplication transmission is configured for an SL signaling radio bearer, the UE 800 may determine that duplication transmission is activated for the SL signaling bearer. According to an embodiment of the present disclosure, when duplication transmission is config-

TABLE 6

| | |
|---|---|
| SL-DuplicationConfig ::= | SEQUENCE { |
| threshSL-Reliability | SL-Reliability, |
| allowedCarrierFreqConfig   OPTIONAL,  -- Need OR | SL-Reliability-Dest-CarrierFreqList |
| ... | |
| } | |
| SL-Reliability-Dest-CarrierFreqList ::= | SEQUENCE (SIZE (1..maxSL-Dest)) OF SL-Reliability-Dest-CarrierFreq |
| SL-Reliability-Dest-CarrierFreq ::= | SEQUENCE { |
| destinationInfoList | SL-DestinationInfoList   OPTIONAL,  -- Need OR |
| allowedCarrierFreqList | SL-AllowedCarrierFreqList   OPTIONAL  -- Need OR |
| } | |
| SL-AllowedCarrierFreqList ::= | SEQUENCE { |
| allowedCarrierFreqSet1 | SEQUENCE (SIZE (1..maxFreqV2X)) OF ARFCN-ValueNR, |
| allowedCarrierFreqSet2 | SEQUENCE (SIZE (1..maxFreqV2X)) OF ARFCN-ValueNR, |
| ... | |
| allowedCarrierFreqSetN | SEQUENCE (SIZE (1..maxFreqV2X)) OF ARFCN-ValueNR |
| // If present, NGRAN shall ensure allowedCarrierFreqSet1 and allowedCarrierFreqSet2 do not include the same carrier frequency. | |
| } | |

The SL duplication transmission information included in the SL configuration may include Table 7 below. Table 7 may include at least one or a combination of duplication transmission activation or deactivation for an SL radio bearer, an SL duplication transmission carrier, mapping information between the SL duplication transmission carrier ured for an SL data radio bearer, the UE 800 may determine that duplication transmission has been activated for the SL data bearer according to a duplication transmission activation configuration or activation indication for the SL data radio bearer.

TABLE 7

| | |
|---|---|
| SL-PDCP-Config-r16 ::=    SEQUENCE { | |
| ... | |
| pdcp-Duplication         BOOLEAN    OPTIONAL     -- Need R | |
| // pdcp-Duplication: Indicates whether or not sidelink duplication status at the time of receiving this IE is configured and activated. The presence of this field indicates that duplication is configured. The value of this field, when the field is present, indicates the initial state of the duplication. If set to true, duplication is activated. The value of this field is always true, when configured for a SL SRB. | |
| allowedCarrierFreqConfig       SL-Reliability-CarrierFreqList    OPTIONAL,  -- Need R | |
| ... | |
| } | |

TABLE 7-continued

```
SL-Reliability-CarrierFreqList ::=      SEQUENCE {
    allowedCarrierFreqSet1              SEQUENCE (SIZE (1..maxFreqV2X)) OF ARFCN-
ValueNR,
    allowedCarrierFreqSet2              SEQUENCE (SIZE (1..maxFreqV2X)) OF ARFCN-
ValueNR,
    ...
    allowedCarrierFreqSetN              SEQUENCE (SIZE (1..maxFreqV2X)) OF ARFCN-
ValueNR
// If present, NGRAN shall ensure allowedCarrierFreqSet1 and allowedCarrierFreqSet2 do not
include the same carrier frequency.
}
```

Figure 9A:
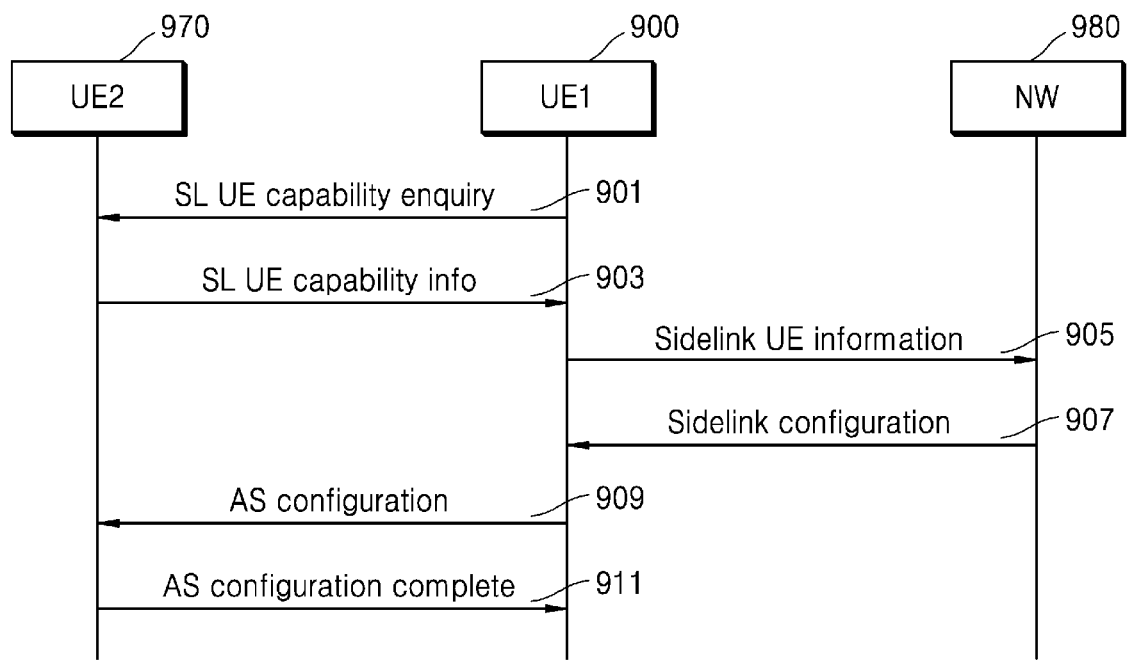
FIG. 9A is a flowchart illustrating an operation, performed by a plurality of terminals, of processing sidelink duplication transmission, according to an embodiment of the present disclosure.
Figure 9B:
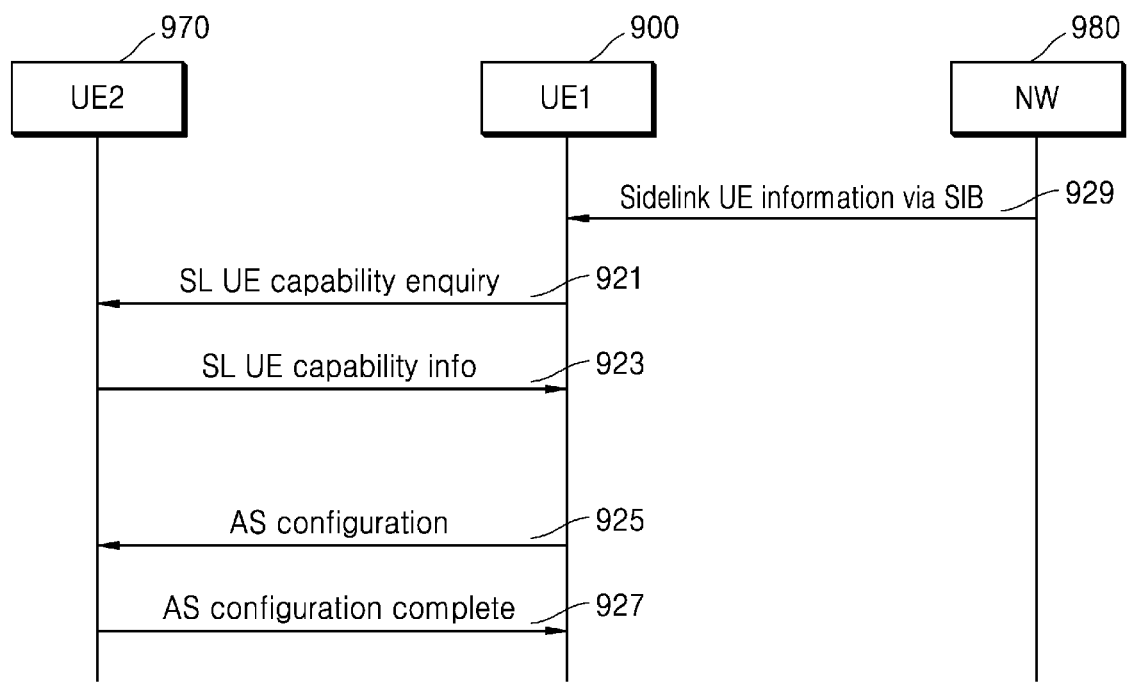
FIG. 9B is a flowchart illustrating an operation, performed by a plurality of terminals, of processing sidelink duplication transmission, according to an embodiment of the present disclosure.
Figure 9C:
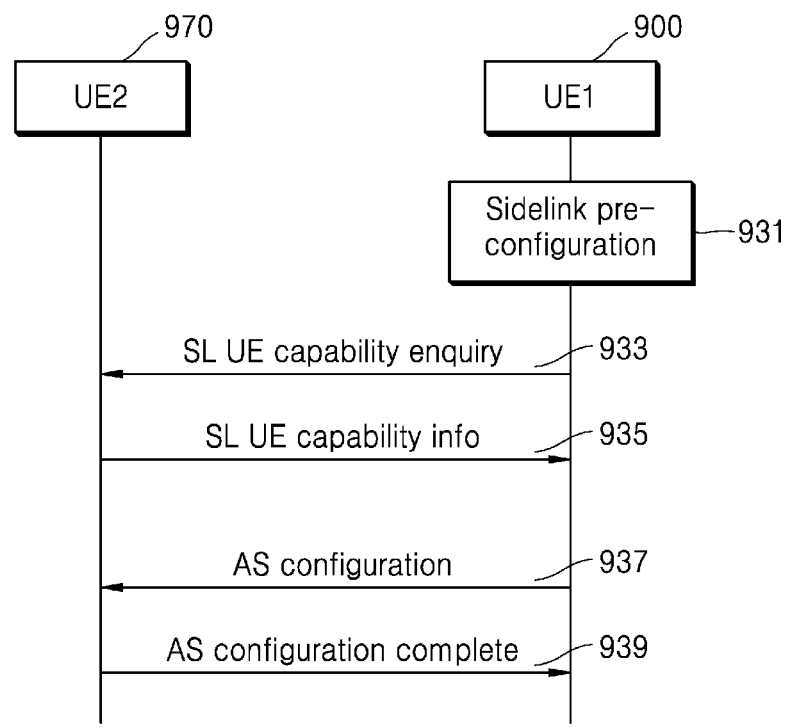
FIG. 9C is a flowchart illustrating an operation, performed by a plurality of terminals, of processing sidelink duplication transmission, according to an embodiment of the present disclosure.

The SL duplication transmission information included in the SL configuration may include Table 8 below. Table 8 may include at least one or a combination of duplication transmission activation or deactivation for an SL radio bearer, an SL duplication transmission carrier, mapping information between the SL duplication transmission carrier and the SL radio bearer. According to an embodiment of the present disclosure, when the duplication transmission is configured for an SL signaling radio bearer, the UE 800 may determine that duplication transmission is activated for the SL signaling bearer. According to an embodiment of the present disclosure, when duplication transmission is configured for an SL data radio bearer, the UE 800 may determine that duplication transmission has been activated for the SL data bearer according to a duplication transmission activation configuration or activation indication for the SL data radio bearer.

illustrates a case in which the UEs are in RRC_CONNECTED state, FIG. 9B illustrates a case in which the UEs are in RRC_IDLE state or RRC_INACTIVE state, and FIG. 9C illustrates a case in which the UEs are in an 00C state.

Referring to FIG. 9A, a first UE 900 may perform SL unicast-based data transmission/reception with a second UE 970. In operation 901, the first UE 900 may transmit, to the second UE 970, signaling for requesting SL capability information.

In operation 903, the second UE 970 may transmit SL capability information to the first UE 900, in response to the SL capability information request. The SL capability information received from the second UE 970 may include capability information related to SL duplication transmission as shown in Table 4.

In operation 905, the first UE 900 may transmit, to a network 980 (hereinafter, referred to as the NW 980),

TABLE 8

```
SL-RadioBearerConfig-r16 ::= SEQUENCE {
    slrb-Uu-ConfigIndex-r16         SLRB-Uu-ConfigIndex-r16,
    sl-SDAP-Config-r16                                            SL-SDAP-Config-r16
OPTIONAL,  -- Cond SLRB Setup
    sl-PDCP-Config-r16                                            SL-PDCP-Config-r16
OPTIONAL,  -- Cond SLRB Setup
    sl-Duplication-Config           SL-Duplication-Config         OPTIONAL,
}
SL-Duplication-Config : :=     SEQUENCE {
    allowedCarrierFreqConfig        SL-Reliability-CarrierFreqList  OPTIONAL,    --
Need OR ...
}
SL-Reliability-CarrierFreqList ::=      SEQUENCE (SIZE  (1..maxNrofSLRB))  OF  SL-
Reliability-CarrierFreq
SL-Reliability-CarrierFreq ::=    SEQUENCE {
    pdcp-Duplication   BOOLEAN
// pdcp-Duplication: Indicates whether or not sidelink duplication status at the time of receiving
this IE is configured and activated. The value of this field indicates the initial state of the
duplication. If set to true, duplication is activated. The value of this field is always true, when
configured for a SL SRB.
    allowedCarrierFreqList          SL-AllowedCarrierFreqList    OPTIONAL   -- Need OR
}
SL-AllowedCarrierFreqList ::=      SEQUENCE {
    allowedCarrierFreqSet1          SEQUENCE  (SIZE  (1..maxFreqV2X))  OF  ARFCN-
ValueNR,
    allowedCarrierFreqSet2          SEQUENCE  (SIZE  (1..maxFreqV2X))  OF  ARFCN-
ValueNR,
    ...
    allowedCarrierFreqSetN          SEQUENCE (SIZE (1..maxFreqV2X)) OF ARFCN-
ValueNR
// If present, NGRAN shall ensure allowedCarrierFreqSet1 and allowedCarrierFreqSet2 do not
include the same carrier frequency.
}
```

FIGS. 9A to 9C are flowcharts illustrating operations, performed by a plurality of UEs, of processing SL duplication transmission, according to an embodiment of the present disclosure. In detail, FIGS. 9A to 9C illustrate embodiments in which duplication transmission is performed by using an SL unicast scheme, respectively, wherein FIG. 9A information required for SL data transmission/reception with the second UE 970. In operation 907, the first UE 900 may obtain SL bearer configuration information from the NW 980. The information required for SL data transmission/reception, the information being transmitted in operation 905, may include at least one or a combination of the SL capability information obtained in operation 903, for example, the information of Table 4, SL unicast flow information, and QoS information of the SL unicast flow.

Although not illustrated in FIG. 9, signaling for exchanging the SL capability information of the first UE 900 with the NW 980 may be performed through operations 801 to 803 of FIG. 8A. The SL configuration information received in operation 907 may include the SL duplication transmission information of Tables 5 to 8. The first UE 900 may obtain at least one or a combination of an SL duplication transmission configuration and an SL duplication transmission activation/deactivation configuration, from the SL duplication transmission information received in operation 907. The first UE 900 may configure SL duplication transmission information to be transmitted to the second UE 970 based on the SL duplication transmission information.

In operation 909, the first UE 900 may transmit an access stratum (AS) configuration message including the SL duplication transmission information, to the second UE 970. The AS configuration message may include at least one or a combination of information of SL carriers for performing SL duplication transmission, an SL radio bearer mapped to each carrier, an SL logical channel group mapped to each carrier, SL logical channels mapped to each carrier, and reception resource pool information of each SL carrier. In operation 911, in response thereto, the second UE 970 may transmit an AS configuration complete message to the first UE 900. The first UE 900 and the second UE 970 may determine activation or deactivation of SL duplication transmission based on the SL duplication transmission information, and perform SL duplication transmission.

FIG. 9B is a flowchart illustrating an operation of processing SL duplication transmission when the first UE 900 is in RRC_IDLE state or RRC_INACTIVE state. Referring to FIG. 9B, the first UE 900 may perform SL unicast-based data transmission/reception with the second UE 970. In operation 921, the first UE 900 may transmit, to the second UE 970, signaling for requesting SL capability information.

In operation 923, the second UE 970 may transmit SL capability information to the first UE 900 in response to the SL capability information request. The SL capability information received from the second UE 970 may include capability information related to the above-described SL duplication transmission as shown in Table 4.

In operation 929, the first UE 900 may obtain SL bearer configuration information from system information transmitted by the NW 980. Although FIG. 9B illustrates, for convenience of description, that the NW 980 receives SL configuration information through an SIB before operation 921, it will be apparent that the SL configuration information may be received before or after UE capability information is received from the second UE 970. That is, operation 929 may be performed before operation 925 as well as before operation 921. For example, when a capability negotiation including packet duplication is performed in configuring an RRC connection, the SL configuration information may be obtained from the system information after operation 921 and before operation 925. Meanwhile, when the system information is obtained and then it is determined that packet duplication configuration is required, rather than in configuring a PC5-RRC connection, a capability negotiation including packet duplication and AS configuration may be performed.

The SL configuration information of operation 929 may include the SL duplication transmission information of Tables 5 to 8. The first UE 900 may obtain at least one or a combination of an SL duplication transmission configuration and an SL duplication transmission activation/deactivation configuration, from the SL duplication transmission information received in operation 929.

The first UE 900 may configure SL duplication transmission information based on the SL duplication transmission information and the SL capability information of the first UE 900 and the second UE 970. In operation 925, the first UE 900 may transmit an AS configuration message including the SL duplication transmission information, to the second UE 970. The AS configuration message may include at least one or a combination of information of SL carriers for performing SL duplication transmission, an SL radio bearer mapped to each carrier, an SL logical channel group mapped to each carrier, SL logical channels mapped to each carrier, and reception resource pool information of each SL carrier.

In operation 927, the second UE 970 may transmit, to the first UE 900, an AS configuration complete message in response to the AS configuration message. The first UE 900 and the second UE 970 may determine activation or deactivation of SL duplication transmission based on the SL duplication transmission information, and perform SL duplication transmission.

FIG. 9C is a flowchart illustrating an operation of processing SL duplication transmission when the first UE 900 and the second UE 970 are in an OOC state.

Referring to FIG. 9C, the first UE 900 may perform SL unicast-based data transmission/reception with the second UE 970. In operation 931, the first UE 900 may obtain preconfigured SL bearer information (SL preconfiguration). In this case, as described above with reference to FIG. 9B, the SL preconfiguration information may be obtained before SL duplication configuration. The description provided above with reference to FIG. 9B will be omitted. The SL configuration information in operation 931 may include the SL duplication transmission information of Tables 5 to 8. The first UE 900 may obtain at least one or a combination of an SL duplication transmission configuration and an SL duplication transmission activation/deactivation configuration, from the SL duplication transmission information obtained in operation 931.

In operation 933, the first UE 900 may transmit, to the second UE 970, signaling for requesting SL capability information.

In operation 935, the second UE 970 may transmit SL capability information to the first UE 900 in response to the SL capability information request. The SL capability information received from the second UE 970 may include capability information related to the above-described SL duplication transmission as shown in Table 4.

The first UE 900 may configure SL duplication transmission information to be transmitted to the second UE 970, based on the SL duplication transmission information and the SL capability information of the first UE 900 and the second UE 970. In operation 937, the first UE 900 may transmit an AS configuration message including the SL duplication transmission information, to the second UE 970. The AS configuration message may include at least one or a combination of information of SL carriers for performing SL duplication transmission, an SL radio bearer mapped to each carrier, an SL logical channel group mapped to each carrier, SL logical channels mapped to each carrier, and reception resource pool information of each SL carrier.

In operation 939, in response thereto, the second UE 970 may transmit an AS configuration complete message to the first UE 900. The first UE 900 and the second UE 970 may determine activation or deactivation of SL duplication transmission based on the SL duplication transmission information, and perform SL duplication transmission.

As in the embodiments described above with reference to FIGS. 9A to 9C, the configuration and activation/deactivation of SL unicast-based duplication transmission may be determined based on the conditions of Table 3 and the SL duplication transmission capabilities (e.g., an SL frequency, an SL band combination, etc. supportable for duplication transmission) of the two UEs 900 and 970.

According to an embodiment of the present disclosure, a network may use RRC signaling including Tables 5 to 8 described above, as signaling for indicating activation or deactivation of SL duplication transmission of a UE. According to an embodiment of the present disclosure, system information including Tables 5 to 8 described above may be used for signaling for indicating activation or deactivation of SL duplication transmission of a UE. According to an embodiment of the present disclosure, a preconfiguration including Tables 5 to 8 described above may also be used for signaling for indicating activation or deactivation of SL duplication transmission of a UE. According to an embodiment of the present disclosure, when SL duplication transmission is configured based on signaling including Tables 5 to 8, the SL duplication transmission may be activated or deactivated by default. According to an embodiment of the present disclosure, when SL duplication transmission is configured based on signaling including Tables 5 to 8, the SL duplication transmission may be activated until a corresponding SL radio bearer is released. According to an embodiment of the present disclosure, a network may use an SL duplication transmission activation/deactivation MAC CE, as signaling for indicating activation or deactivation of SL duplication transmission of a UE. The SL duplication transmission activation/deactivation MAC CE may be classified as a logical identifier (LCD).

(MAC CE Example 1)

Si may correspond to SL radio bearer i. When the value of Si is set to 0, the UE may determine that duplication transmission is deactivated, and when the value of Si is set to 1, the UE may determine that duplication transmission is activated. In an embodiment, MAC CE Example 1 may be used for an SL signaling radio bearer and an SL data radio bearer. In an embodiment, MAC CE Example 1 may be used for an SL data radio bearer.

| $S_7$ | $S_6$ | $S_5$ | $S_4$ | $S_3$ | $S_2$ | $S_1$ | $S_0$ |
|---|---|---|---|---|---|---|---|

Si: this field indicates the activation/deactivation status of PDCP duplication of SLRB i where i is the ascending order of the SLRB ID among the SLRBs configured with PDCP duplication and with RLC entity(ies) associated with this MAC entity.

(MAC CE Example 2)

PC5-RRC may correspond to SL RRC, PC5-S may correspond to PC5-S signaling, and Si may correspond to SL data radio bearer i. When the value of each field is set to 0, the UE may determine that duplication transmission is deactivated, and when the value of each field is set to 1, the UE may determine that duplication transmission is activated.

| PC5-RRC | PC5-S | Reserved | | | | | |
|---|---|---|---|---|---|---|---|
| $S_7$ | $S_6$ | $S_5$ | $S_4$ | $S_3$ | $S_2$ | $S_1$ | $S_0$ |

Si: this field indicates the activation/deactivation status of PDCP duplication of SLRB i where i is the ascending order of the SLRB ID among the SLRBs configured with PDCP duplication and with RLC entity(ies) associated with this MAC entity.

(MAC CE Example 3)

When the UE has one or more non-primary SL RLC entities, the MAC CE may indicate the activation or deactivation of duplication transmission for each RLC entity. RLC M may indicate an M-th RLC entity. When the value of the parameter is set to 0, the UE may determine that duplication transmission deactivation is indicated, and when the value of the parameter is set to 1, the UE may determine that duplication transmission activation is indicated. This may be used to indicate activation or deactivation of duplication transmission for each of the SL signaling radio bearer and the SL data radio bearer.

| RLC0 | RLC1 | RLC2 | ... | RLC M | Reserved |
|---|---|---|---|---|---|

According to an embodiment of the present disclosure, signaling for indicating activation or deactivation of SL duplication transmission between two UEs performing SL unicast-based data transmission/reception may be PC5 RRC signaling including Tables 5 to 8 described above. According to an embodiment of the present disclosure, when SL duplication transmission is configured based on PC5 RRC signaling including Tables 5 to 8, the SL duplication transmission may be activated by default. According to an embodiment of the present disclosure, when SL duplication transmission is configured based on PC5 RRC signaling including Tables 5 to 8, the SL duplication transmission may be deactivated by default. According to an embodiment of the present disclosure, when SL duplication transmission is configured based on PC5 RRC signaling including Tables 5 to 8, the SL duplication transmission may be activated until a corresponding SL radio bearer is released. According to an embodiment of the present disclosure, signaling for indicating activation or deactivation of SL duplication transmission between two UEs may use a PC5 duplication transmission activation/deactivation MAC CE. For example, the format of the PC5 duplication transmission activation/deactivation MAC CE may correspond to MAC CE Example 1, MAC CE Example 2, or MAC CE Example 3 described above.

According to an embodiment of the present disclosure, information indicating activation or deactivation of SL duplication transmission may be included in SL control information (SCI) of a transmitting terminal and transmitted. Activation or deactivation indication of the SCI may be applied to an SL radio bearer transmitted in a transport block (TB) indicated by the SCI including the activation/deactivation indication information. The transmitting terminal may include, in a TB, a packet of one or more SL radio bearers for which SL duplication transmission is activated, and indicate activation of duplication transmission in the SCI of the TB. A receiving terminal may determine that SL duplication transmission has been activated for the packet of the SL radio bearer included in the TB indicated by the SCI indicating activation of the duplication transmission. The transmitting terminal may include, in a TB, a packet of one or more SL radio bearers for which SL duplication transmission is deactivated, and indicate deactivation of duplication transmission in the SCI of the TB. The receiving terminal may determine that SL duplication transmission has been deactivated for the packet of the SL radio bearer included in the TB indicated by the SCI indicating deactivation of the duplication transmission.

According to an embodiment of the present disclosure, when the state of a UE is changed while performing SL duplication transmission, the UE may process the SL duplication transmission according to signaling corresponding to the state of the UE, among those illustrated in FIGS. 8A to 9C. For example, when the UE transitions from RRC_CONNECTED state to RRC_IDLE state, the UE may stop using SL duplication transmission information of RRC received from the network and operate according to SL duplication transmission information obtained from system information. For example, when the UE transitions from an OOC state to RRC_CONNECTED state, the UE may stop using preconfigured SL duplication transmission information and operate according to SL duplication transmission information of RRC received from the network.

FIG. 10 is a diagram for describing an operation, performed by a terminal, of processing SL duplication transmission, according to an embodiment of the present disclosure.

Figure 10A:
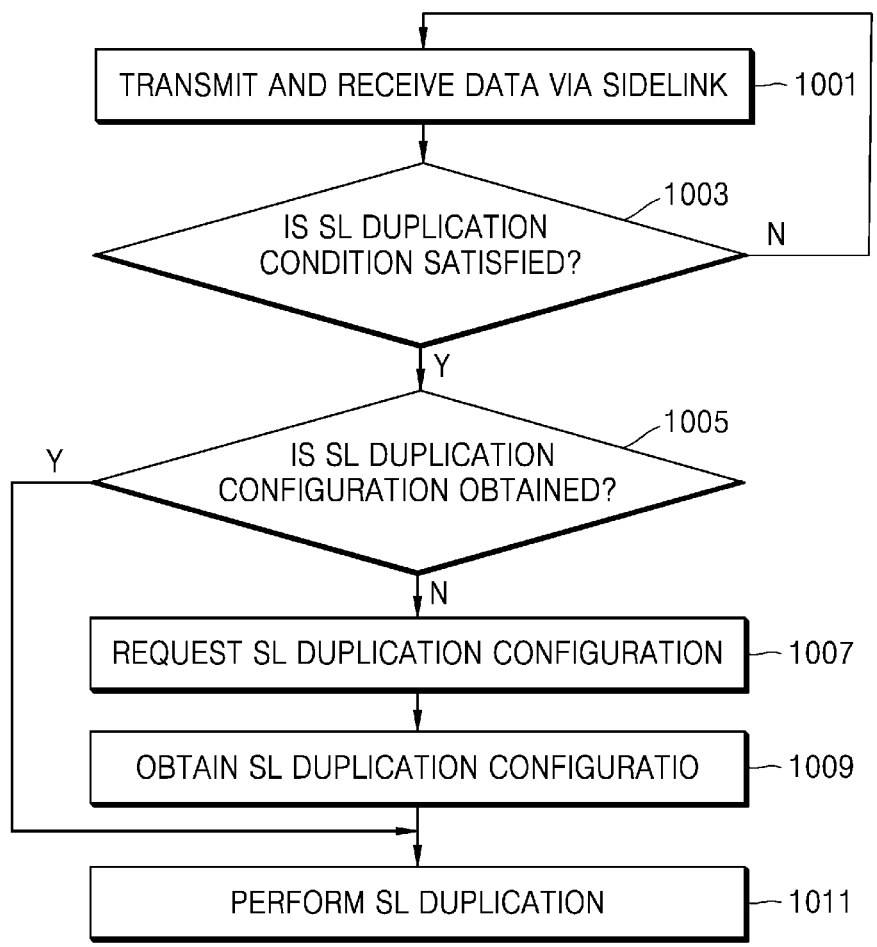
FIG. 10A is a flowchart illustrating an operation of processing sidelink duplication transmission when a terminal is in an RRC-connected state, according to an embodiment of the present disclosure.
Figure 10B:
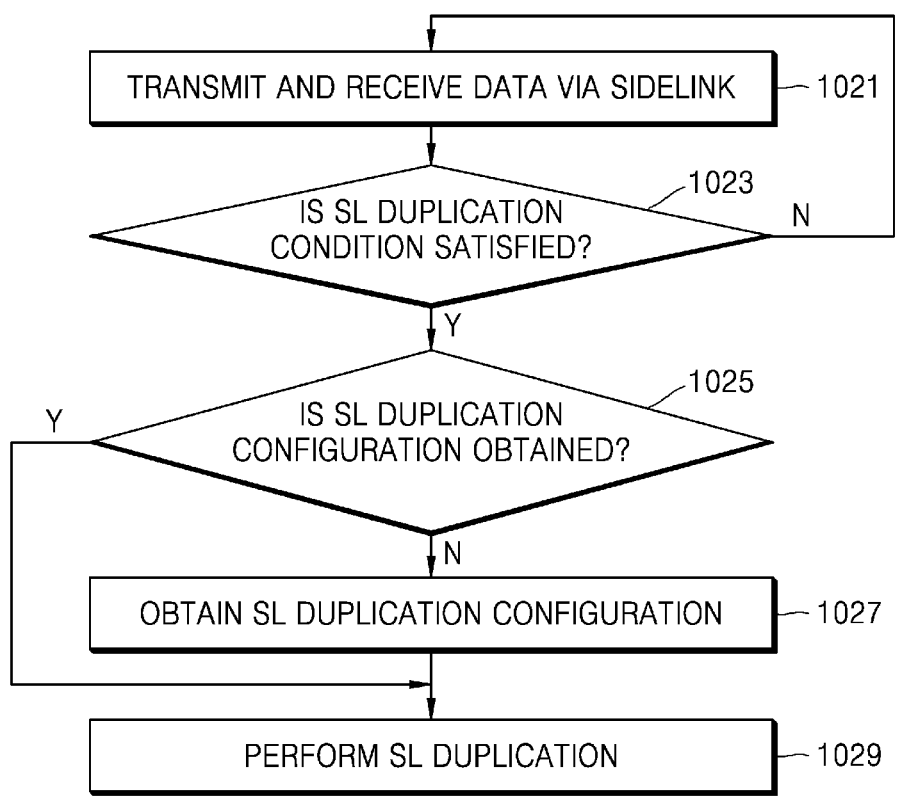
FIG. 10B is a flowchart illustrating an operation of processing sidelink duplication transmission when a terminal is in RRC_IDLE state, RRC_INACTIVE state, or an OOC state, according to an embodiment of the present disclosure.

In detail, FIGS. 10A and 10B illustrate embodiments in which SL duplication transmission is performed, respectively, wherein FIG. 10A illustrates a case in which the terminal is in RRC_CONNECTED state, and FIG. 10B illustrates a case in which the terminal is in RRC_IDLE state, RRC_INACTIVE state, or an OOC state.

FIG. 10A illustrates an operation, performed by a transmitting terminal or a receiving terminal, of performing bidirectional SL unicast transmission and reception. The case of bidirectional SL unicast may correspond to a case in which, for example, a bidirectional RLC acknowledged mode (AM) or a bidirectional RLC unacknowledged mode (UM) is configured. In an embodiment, the terminal may determine that SL duplication transmission configuration for bidirectional SL unicast is applied to each direction of a unicast bearer.

The transmitting terminal may transmit an AS configuration message including SL duplication transmission configuration information to the receiving terminal. One of the two terminals may transmit the AS configuration message including the SL duplication transmission configuration information to the other terminal. The terminal that has received the AS configuration may determine that the SL duplication transmission configuration is applied to each direction of SL unicast. In an embodiment, the terminal may determine that the SL duplication transmission configuration for bidirectional SL unicast is separately configured for each direction of the unicast bearer. The transmitting terminal may transmit the AS configuration message including the SL duplication transmission configuration information to the receiving terminal. One of the two terminals may transmit the AS configuration message including the SL duplication transmission configuration information to the other terminal. The terminal that has received the AS configuration may determine that the SL duplication transmission configuration is applied to a corresponding direction (AS configuration transmission→AS configuration reception).

Referring to FIG. 10A, in operation 1001, the terminal may transmit and receive data via an SL. In operation 1003, the terminal may determine whether a condition for performing SL duplication transmission is satisfied. When it is determined, in operation 1003, that the condition for performing SL duplication transmission is not satisfied, the terminal may perform operation 1001 again. When it is determined, in operation 1003, that the condition for performing SL duplication transmission is satisfied, in operation 1005, the terminal may determine whether SL duplication transmission information has been obtained.

When it is determined, in operation 1005, that the SL duplication transmission information has not been obtained, in operation 1007, the terminal may request a network for the SL duplication transmission information. In operation 1009, the terminal may obtain the SL duplication transmission information from the network. In operation 1011, the terminal may perform an SL duplication transmission operation based on the SL duplication transmission information. When it is determined, in operation 1005, that the SL duplication transmission information has been obtained, the terminal may proceed to operation 1011 to perform an SL duplication transmission operation based on the SL duplication transmission information. The SL duplication transmission information may include at least one or a combination of Tables 5 to 8 described above. The SL duplication transmission information may include at least one or a combination of MAC CE Example 1, MAC CE Example 2, and MAC CE Example 3. The operations of the terminal in operations 1007 to 1009 may correspond to all or part of the operations illustrated in FIG. 8A (excluding the capability negotiation operation).

Referring to FIG. 10B, in operation 1021, the terminal may transmit and receive data via an SL. In operation 1023, the terminal may determine whether a condition for performing SL duplication transmission is satisfied. When it is determined, in operation 1023, that the condition for performing SL duplication transmission is not satisfied, the terminal may perform operation 1021 again. When it is determined, in operation 1023, that the condition for performing SL duplication transmission is satisfied, in operation 1025, the terminal may determine whether SL duplication transmission information has been obtained. When it is determined, in operation 1025, that the SL duplication transmission information has not been obtained, in operation 1027, the terminal may obtain the SL duplication transmission information. In operation 1027, the terminal may perform the operations illustrated in FIG. 8B (obtaining the information from system information) or FIG. 8C (obtaining the information from a preconfiguration). In operation 1029, the terminal may perform an SL duplication transmission operation based on the SL duplication transmission information.

When it is determined, in operation 1025, that the SL duplication transmission information has been obtained, the terminal may proceed to operation 1029 to perform an SL duplication transmission operation based on the SL duplication transmission information. The SL duplication transmission information may include at least one or a combination of Tables 5 to 8 described above. The SL duplication transmission information may include at least one or a combination of MAC CE Example 1, MAC CE Example 2, and MAC CE Example 3.

Figure 11A:
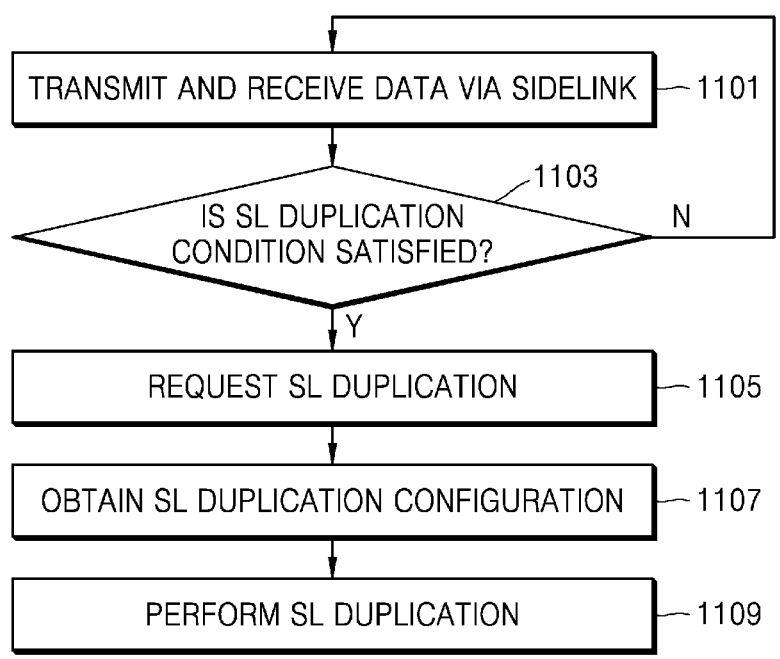
FIG. 11A is a diagram for describing an operation, performed by a terminal, of processing sidelink duplication transmission, according to an embodiment of the present disclosure.
Figure 11B:
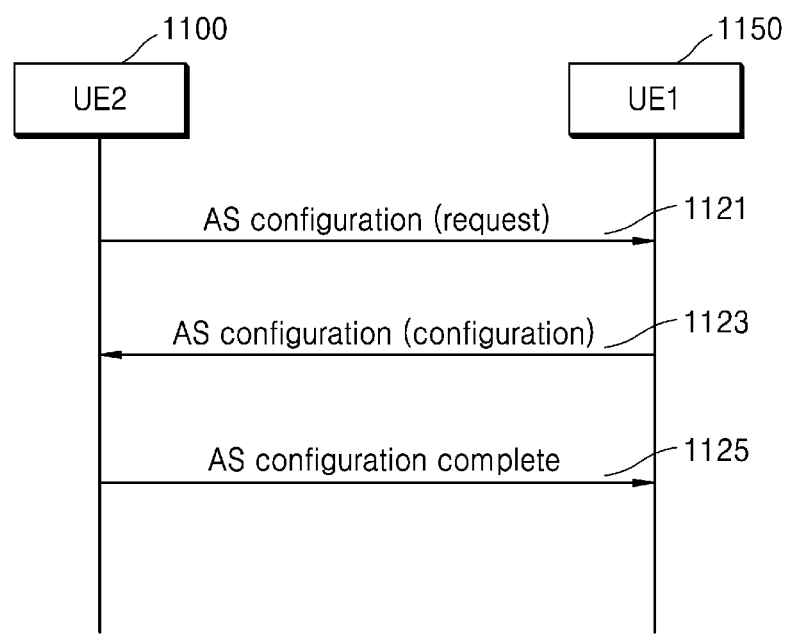
FIG. 11B is a diagram for describing operations, performed by terminals, of processing sidelink duplication transmission, according to an embodiment of the present disclosure.

FIGS. 11A and 11B are diagrams for describing operations, performed by UEs, of processing SL duplication transmission, according to an embodiment of the present disclosure. FIGS. 11A to 11B illustrate embodiments of operations in which a receiving UE of SL unicast processes SL duplication transmission.

Referring to FIG. 11A, in operation 1101, the UE may transmit and receive data via an SL. In operation 1103, the UE may determine whether a condition for performing SL duplication transmission is satisfied. The determination in operation 1103 may be performed based on Table 3 described above. When it is determined, in operation 1103, that the condition for performing SL duplication transmission is not satisfied, the UE may return to operation 1101. When it is determined, in operation 1103, that the condition for performing SL duplication transmission is satisfied and configuration information for SL duplication transmission with the counterpart UE has not been obtained, in operation 1105, the UE may transmit, to the counterpart UE, a message for requesting SL duplication transmission. The message for requesting SL duplication transmission may include at least one or a combination of an SL unicast radio bearer, an SL unicast logical channel identifier, an SL unicast logical channel group, SL duplication transmission capability information of the UE (e.g., an SL carrier frequency, an SL band combination), which satisfy a condition for performing SL duplication transmission.

In operation 1107, the UE may obtain SL duplication transmission information. In operation 1109, the UE may perform an SL duplication transmission operation based on the obtained SL duplication transmission information. The SL duplication transmission information may include at least one or a combination of Tables 5 to 8 described above. The SL duplication transmission information may include at least one or a combination of MAC CE Example 1, MAC CE Example 2, and MAC CE Example 3.

Referring to FIG. 11B, a second UE 1100 may perform SL unicast-based data transmission/reception with a first UE 1150. The second UE 1100 may determine that a condition for performing SL duplication transmission is satisfied, and SL duplication transmission configuration information with the first UE 1150 is not obtained. In this case, in operation 1121, the second UE 1100 may transmit, to the first UE 1150, an AS configuration message including an SL duplication transmission configuration information request. The operation, performed by the second UE 1100, of determining whether the condition for performing SL duplication transmission is satisfied may be performed based on Table 3 described above.

In operation 1123, the first UE 1150 may transmit an AS configuration including configuration information for performing SL duplication transmission with the second UE 1100. The AS configuration in operation 1123 may include at least one or a combination of Tables 5 to 8 described above.

In operation 1125, in response thereto, the second UE 1100 may transmit an AS configuration complete message to the first terminal 1150. Thereafter, the first UE 1150 and the second UE 1100 may exchange information for indicating activation or deactivation of SL duplication transmission by using at least one or a combination of MAC CE Example 1, MAC CE Example 2, and MAC CE Example 3, according to the SL duplication transmission configuration information included in the AS configuration.

According to the embodiments described above with reference to FIGS. 8A to 11B, when a transmitting UE operates in mode2 (in which the UE allocates resources by itself), selection or reselection of an SL carrier for performing duplication transmission may be performed by the transmitting UE. In addition, the selection may be performed based on at least one or a combination of an SL carrier or SL resource pool supportable by a first UE and a second UE, a congestion level of an SL resource carrier, a congestion level of the SL resource pool, a reliability level of an SL flow to which duplication transmission is to be applied, a reliability level of an SL radio bearer to which duplication transmission is to be applied, a reliability level of an SL logical channel group to which duplication transmission is to be applied, and a reliability level of an SL logical channel to which duplication transmission is to be applied.

FIG. 12 is a diagram for describing operations, performed by UEs, of processing deactivation of SL duplication transmission, according to an embodiment of the present disclosure. The embodiments of FIG. 12 illustrate operations, performed by UEs and a network, of processing deactivation of SL duplication transmission.

Figure 12A:
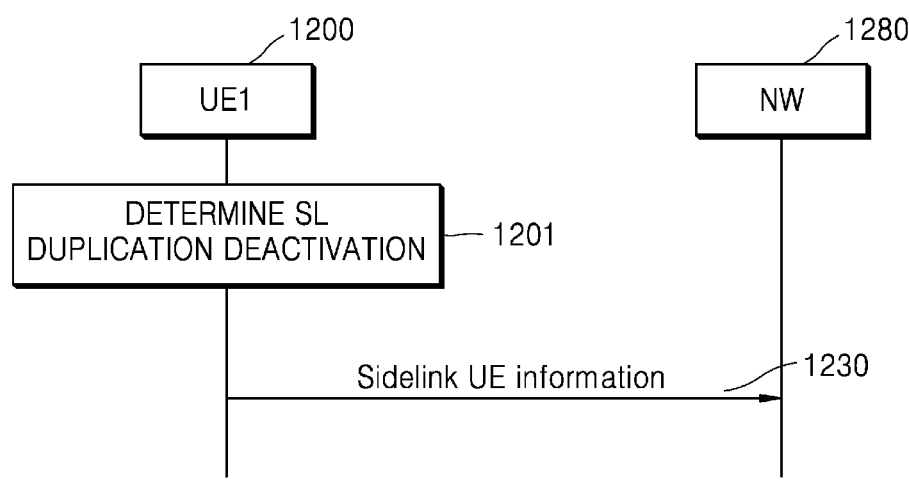
FIG. 12A is a diagram for describing an operation, performed by a terminal, of processing deactivation of sidelink duplication transmission, according to an embodiment of the present disclosure.

Referring to FIG. 12A, in operation 1201, a first UE 1200 may determine deactivation of SL duplication transmission. In this case, the first UE 1200 may determine the deactivation of SL duplication transmission based on SL duplication transmission configuration information obtained from at least one or a combination of Tables 3 and 5 to 8. When it is determined that the first UE 1200 is in RRC_CONNECTED state, the first UE 1200 may transmit an SidelinkUEInformation message for informing a network 1280 (hereinafter, referred to as the NW 1280) of the deactivation of SL duplication transmission. The SidelinkUEInformation message may include at least one or a combination of an SL radio bearer, an SL logical channel, an SL logical channel group, an SL unicast link, an SL flow, and an SL destination, which correspond to deactivation of SL duplication transmission.

Figure 12B:
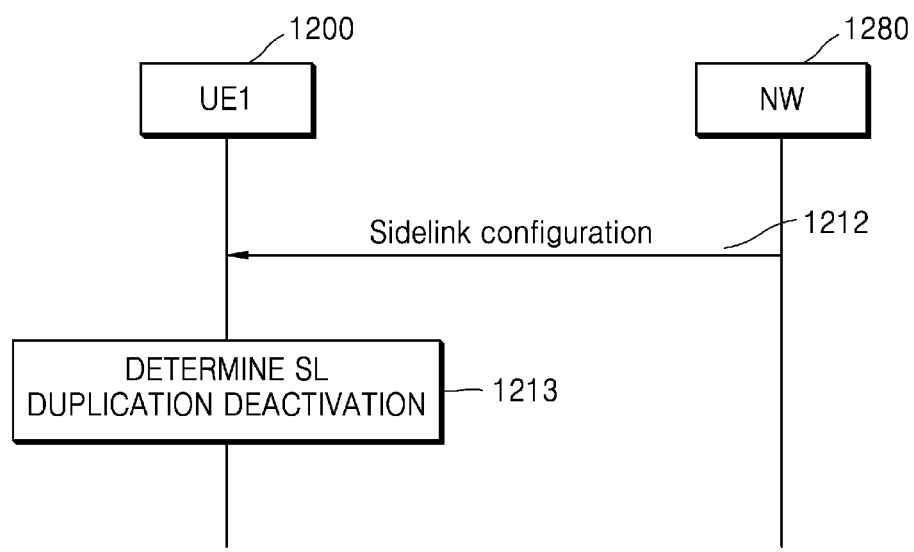
FIG. 12B is a diagram for describing an operation, performed by a terminal, of processing deactivation of sidelink duplication transmission, according to an embodiment of the present disclosure.

Referring to FIG. 12B, in operation 1211, the NW 1280 may transmit an SL configuration message including SL duplication transmission configuration information. The SL configuration message may include at least one or a combination of Tables 5 to 8 described above. In operation 1213, the first UE 1200 may determine deactivation of SL duplication transmission based on the SL duplication transmission configuration information of the SL configuration message. The determination by the first UE 1200 in operation 1213 may be performed based on SL duplication transmission configuration information obtained from at least one or a combination of Tables 3, 5, and 8. Although not illustrated in FIG. 12B, the first UE 1200 may transmit a SidelinkUEInformation message to the NW 1280 in order to notify the NW 1280 of deactivation of SL duplication transmission, as in operation 1203.

According to the embodiments described above with reference to FIGS. 12A and 12B, when it is determined that SL duplication transmission is deactivated, a transmitting UE may inform a BS of SL bearer information for which the duplication transmission corresponding to mode 1 (BS scheduling-based resource allocation) is deactivated. The transmitting UE may stop an SL grant obtaining procedure for the SL bearer for which the duplication transmission corresponding to mode 2 (UE direct resource allocation) is deactivated. Also, the transmitting UE may clear a deactivated SL RLC entity and a corresponding buffer.

Hereinafter, an embodiment in which a transmitting UE performing duplication transmission in SL unicast notifies a counterpart UE of information of a deactivated SL RLC entity will be described with reference to FIGS. 12C to 12D.

Figure 12C:
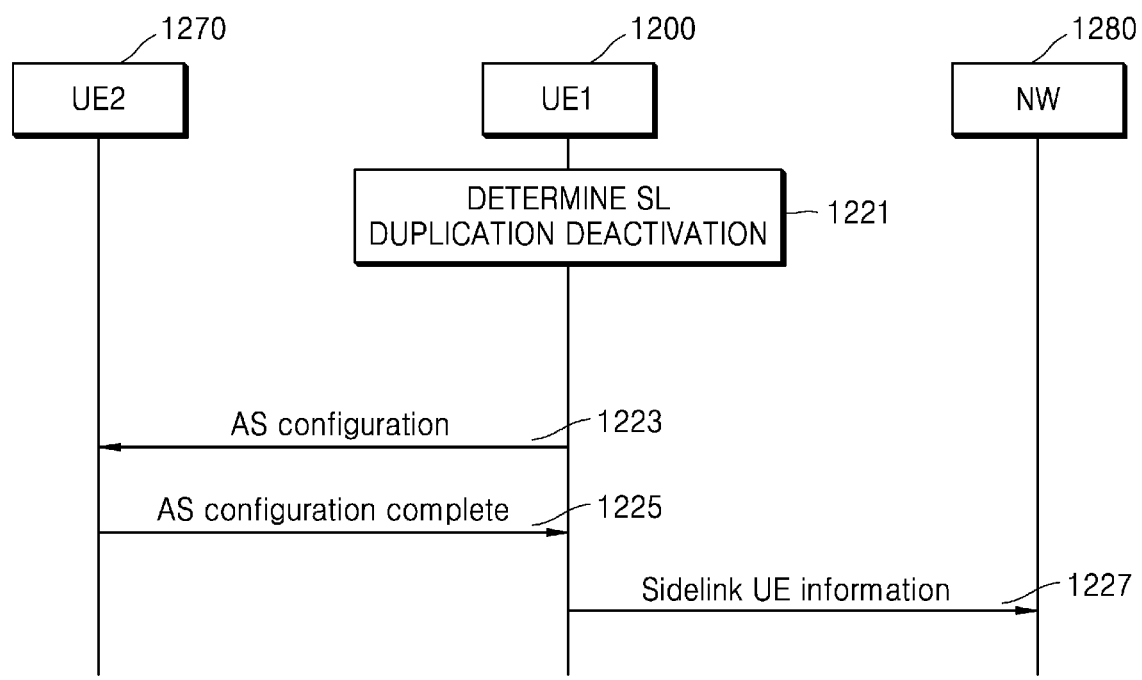
FIG. 12C is a diagram for describing an operation, performed by a terminal, of processing deactivation of sidelink duplication transmission, according to an embodiment of the present disclosure.

Referring to FIG. 12C, in operation 1221, the first UE 1200 may determine deactivation of SL duplication transmission. In operation 1221, the first UE 1200 may determine the deactivation of SL duplication transmission based on at least one or a combination of Tables 3, 5, and 8.

In operation 1223, the first UE 1200 may transmit an AS configuration message including information indicating deactivation of SL duplication transmission to a counterpart second UE 1270. The AS configuration message may include at least one or a combination of an SL radio bearer, an SL logical channel, an SL logical channel group, an SL unicast link, an SL flow, and an SL destination, which correspond to deactivation of SL duplication transmission.

In operation 1225, the second UE 1270 may transmit, to the first UE 1200, an AS configuration complete message in response to the AS configuration message. In operation 1227, the first UE 1200 may transmit a SidelinkUEInformation message to the NW 1280 in order to notify the NW 1280 of deactivation of SL duplication transmission, as in operation 1203 described above.

In the description of operations 1223 to 1225, the AS configuration/AS configuration complete messages are provided as examples of signaling for indicating deactivation of SL duplication transmission. Meanwhile, it will be apparent that the first UE 1200 and the second UE 1270 may notify of the deactivation of SL duplication transmission by using at least one or a combination of MAC CE Example 1, MAC CE Example 2, and MAC CE Example 3.

Figure 12D:
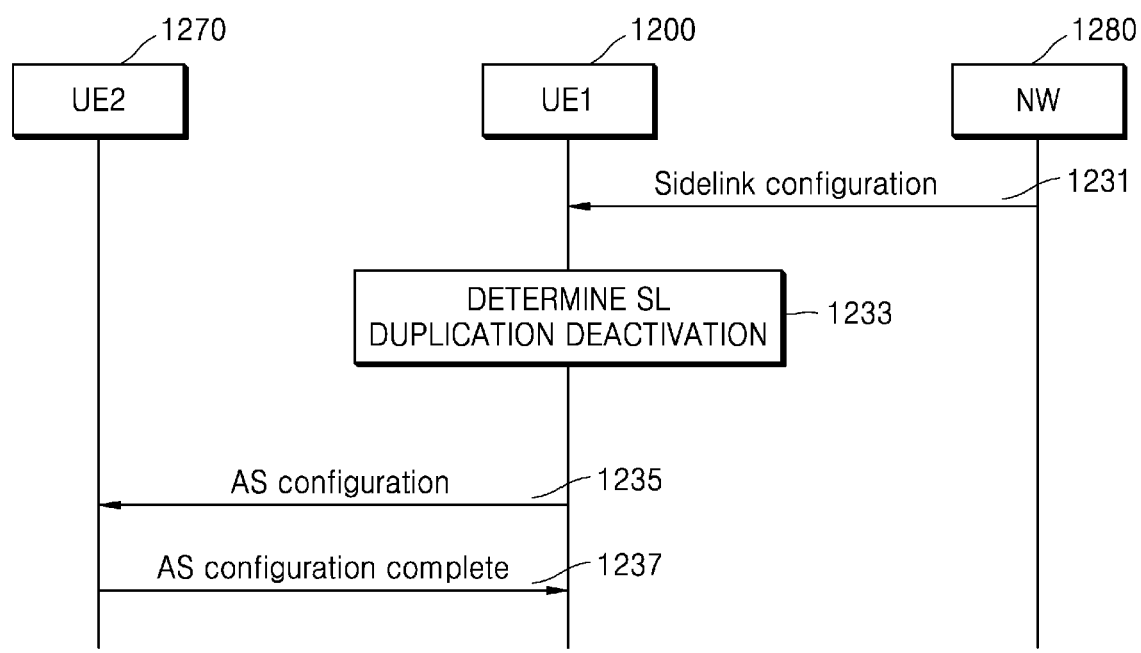
FIG. 12D is a diagram for describing an operation, performed by a terminal, of processing deactivation of sidelink duplication transmission, according to an embodiment of the present disclosure.

Referring to FIG. 12D, the first UE 1200 may receive an SL configuration message from the NW 1280 in operation 1231, and determine deactivation of SL duplication transmission in operation 1233. Operations 1231 to 1233 described above may correspond to the operations illustrated in FIG. 12B.

In operation 1225, the first UE 1200 may transmit an AS configuration message including information indicating deactivation of SL duplication transmission to the counterpart second UE 1270. The AS configuration message may include at least one or a combination of an SL radio bearer, an SL logical channel, an SL logical channel group, an SL unicast link, an SL flow, and an SL destination, which correspond to deactivation of SL duplication transmission. In operation 1237, the second UE 1270 may transmit, to the first UE 1200, an AS configuration complete message in response to the AS configuration message. Although not illustrated in FIG. 12D, the first UE 1200 may transmit a SidelinkUEInformation message to the NW 1280 in order to notify the NW 1280 of deactivation of SL duplication transmission, as in operation 1203 described above.

In the description of operations 1235 to 1237, the AS configuration/AS configuration complete messages are provided as examples of signaling for indicating deactivation of SL duplication transmission. Meanwhile, it will be apparent that the first UE 1200 and the second UE 1270 may notify of the deactivation of SL duplication transmission by using at least one or a combination of MAC CE Example 1, MAC CE Example 2, and MAC CE Example 3.

According to the embodiments described above with reference to FIGS. 12C to 12D, upon reception of notification of deactivation of SL duplication transmission from a transmitting UE, a receiving UE performing duplication transmission in SL unicast may stop monitoring of an SL resource pool or an SL carrier corresponding to a deactivated SL RLC entity. The receiving UE may determine a time point of stopping the monitoring of the deactivated SL resource pool or SL carrier. Also, the receiving UE may stop the monitoring when it is determined that a packet is no longer received from the deactivated SL RLC entity. The receiving UE may clear the deactivated SL RLC entity and buffer. The receiving UE may transmit a packet buffered in the deactivated SL RLC to a higher layer before clearing the buffer.

According to an embodiment of the present disclosure, when SL duplication transmission is configured or activated, a transmitting UE may select an SL logical channel to be transmitted on each SL carrier for performing the SL duplication transmission. For example, when SL duplication transmission is activated according to Tables 5 to 8, an MAC entity of the UE may map logical channels used for duplication transmission to different SL carriers, respectively. When allowedCarrierFreqList is configured for a corresponding SL destination or SL bearer, logical channels used for duplication transmission may be mapped to different SL carriers of different SL carrier sets, respectively.

When SL duplication transmission is configured for SL broadcast or SL groupcast, the transmitting UE may select a logical channel identifier predetermined to be used for SL duplication transmission, and map the logical channel identifier to an SL carrier to perform the duplication transmission. The SL carrier to perform the duplication transmission corresponds to a carrier other than an SL transmission carrier already performing duplication transmission. When SL duplication transmission is configured for SL unicast, the transmitting UE and the receiving UE may exchange logical channel identifier information to be used for the SL duplication transmission. In the case of SL unicast, the same logical channel identifier may be mapped to several SL carriers to be used for duplication transmission. That is, the same logical channel identifier may be used on an SL carrier that already performing duplication transmission, and another SL transmission carrier that is selected for duplication transmission.

Hereinafter, a PDCP operation of a transmitting UE and a receiving UE performing SL duplication transmission according to an embodiment of the present disclosure will be described.

For a radio bearer for which SL duplication transmission is configured, a PDCP entity may be mapped to two RLC UM entities or two RLC AM entities.

In the case of SL unicast to which PDCP in-order delivery is applied, the receiving UE may set a T-reordering value. In the case in which SL duplication transmission is not involved, the receiving UE may not inform the transmitting UE of a T-reordering value. In the case of SL duplication transmission, when the receiving UE receives SL duplication transmission configuration information from the transmitting UE, the receiving UE may inform the transmitting UE of a T-reordering value for an SL radio bearer for which SL duplication transmission is configured. Signaling performed by the receiving UE to inform the transmitting UE of the T-reordering value may use an AS configuration complete message including configuration information of the SL radio bearer or configuration information of SL duplication transmission. The AS configuration complete message refers to a message transmitted in response to an AS configuration. The signaling performed by the receiving UE to inform the transmitting UE of the T-reordering value may use a PDCP control PDU. When the transmitting UE obtains, from the receiving UE, the signaling for informing of the T-reordering value for the SL radio bearer for which duplication transmission is configured, the transmitting UE may minimize an SN gap between PDCP SNs received from several RLC entities in the receiving UE based on the T-reordering value. In addition, the transmitting UE may perform SL duplication transmission so as to minimize a PDCP reordering delay in the receiving UE.

An example of an operation of a PDCP entity of the transmitting UE is shown in Tables 9 to 10.

TABLE 9 if the transmitting PDCP entity is associated with two RLC entities:
- if the SL PDCP duplication is activated:
  - if the PDCP PDU is a PDCP Data PDU:
    - duplicate the PDCP Data PDU and submit the PDCP Data PDU to both associated SL RLC entities;
  - else:
    - submit the PDCP Control PDU to the primary SL RLC entity;
NOTE 2: If the transmitting PDCP entity is associated with two RLC entities, the UE should minimize the amount of PDCP PDUs submitted to lower layers before receiving request from lower layers and minimize the PDCP SN gap between PDCP PDUs submitted to two associated RLC entities to minimize PDCP reordering delay in the receiving PDCP entity.

TABLE 10

For the PDCP entity configured with pdcp-Duplication, the transmitting PDCP entity shall:
- for SL SRBs:
  - activate the PDCP duplication;
- for SL DRBs:
  - if the activation of PDCP duplication is indicated:
    - activate the PDCP duplication;
  - if the deactivation of PDCP duplication is indicated:
    - deactivate the PDCP duplication.

An embodiment of an operation, performed by a transmitting UE performing SL duplication transmission, of discarding a duplicate PDU is shown in Table 11.

TABLE 11

For the PDCP entity configured with pdcp-Duplication, the transmitting PDCP entity shall:
- if the successful delivery of a PDCP Data PDU is confirmed by one of the two associated AM RLC entities:
  - indicate to the other AM RLC entity to discard the duplicated PDCP Data PDU;
- if the deactivation of PDCP duplication is indicated:
  - indicate to the secondary RLC entity to discard all duplicated PDCP Data PDUs.

An embodiment of a service data unit (SDU) discard operation in the PDCP of the transmitting UE is shown in Table 12.

TABLE 12

- At reception of a PDCP SDU from upper layers, the transmitting PDCP entity shall:
  - Start the discardTimer associated with this PDCP SDU (if configured)
- When the discardTimer expires for a PDCP SDU, or the successful delivery of a PDCP SDU is confirmed by PDCP status report, the transmitting PDCP entity shall discard the PDCP SDU along with the corresponding PDCP Data PDU. If the corresponding PDCP Data PDU has already been submitted to lower layers, the discard is indicated to lower layers.
- For SL SRBs, when upper layers request a PDCP SDU discard, the PDCP entity shall discard all stored PDCP SDUs and PDCP PDUs.
- NOTE: Discarding a PDCP SDU already associated with a PDCP SN causes a SN gap in the transmitted PDCP Data PDUs, which increases PDCP reordering delay in the receiving PDCP entity. It is up to UE implementation how to minimize SN gap after SDU discard.

An embodiment of an SDU discard operation in the RLC of the transmitting UE is shown in Table 13.

TABLE 13

- When indicated from upper layer (i.e. PDCP) to discard a particular RLC SDU, the transmitting side of an AM RLC entity or the transmitting UM RLC entity shall discard the indicated RLC SDU, if neither the RLC SDU nor a segment thereof has been submitted to the lower layers.
- The transmitting side of an AM RLC entity shall not introduce an RLC SN gap when discarding an RLC SDU.

An example of an operation of a PDCP entity of the receiving UE is shown in Table 14.

TABLE 14

- Duplicate PDCP PDU is detected, discard the PDCP PDU.
  -if the PDCP Data PDU with COUNT = RCVD_COUNT has been received before:
  -discard the PDCP Data PDU;
- If out of order delivery is configured, deliver PDCP SDU from the received and non-duplicated PDCP PDU to upper layer.
- If t-reordering is configured, handle in order delivery for the received and non-duplicated PDU.

Methods according to claims or embodiments described in the specification of the present disclosure may be implemented in hardware, software, or a combination of hardware and software.

When implemented in software, a computer-readable storage medium storing one or more programs (software modules) may be provided. The one or more programs stored in the computer-readable storage medium are configured for execution by one or more processors in an electronic device. The one or more programs include instructions that cause the electronic device to execute the methods according to the embodiments described in claims or the specification of the present disclosure.

The programs (e.g., software modules or software) may be stored in non-volatile memory including random-access memory (RAM) or flash memory, read-only memory (ROM), electrically erasable programmable ROM (EEPROM), a magnetic disc storage device, a compact disc-ROM (CD-ROM), a digital versatile disc (DVD) or other optical storage device, or a magnetic cassette. Alternatively, the programs may be stored in memory including a combination of some or all of the above-mentioned storage media. In addition, a plurality of such memory units may be included.

Also, the programs may be stored in an attachable storage device accessible through any or a combination of communication networks such as the Internet, an intranet, a local area network (LAN), a wide LAN (WLAN), or a storage area network (SAN). The storage device may access, via an external port, a device for performing an embodiment of the present disclosure. Furthermore, a separate storage device on a communication network may access the device for performing an embodiment of the present disclosure.

In the embodiments of the present disclosure described above, the elements included in the present disclosure have been expressed in the singular or plural form according to the suggested embodiments of the present disclosure. However, the expression in the singular or plural form is appropriately selected according to the suggested situations for convenience of explanation and is not intended to limit the present disclosure to the single or plural elements, and even when a certain element is expressed in the plural form, it may be provided with a single element, and even when a certain element is expressed in the singular form, it may be provided with a plurality of elements.

Although certain embodiments have been described in the detailed description of the present disclosure, various modifications may be made without departing from the scope of the present disclosure. Therefore, the scope of the present disclosure should not be limited to the above-described embodiments of the present disclosure and should be determined by the appended claims and the equivalents thereof.

The invention claimed is:

1. A method performed by a first terminal in a wireless communication system, the method comprising:
    transmitting, to a second terminal, a sidelink the capability information enquiry message;
    in response to the sidelink capability information enquiry message, receiving, from the second terminal, sidelink capability information including capability information for a sidelink duplication transmission;
    obtaining sidelink configuration information including first configuration information for the sidelink duplication transmission;
    transmitting, to the second terminal, a message including second configuration information for the sidelink duplication transmission; and
    in response to the message, receiving, from the second terminal, a complete message.

2. The method of claim 1, wherein the capability information for the sidelink duplication transmission comprises at least one of sidelink packet data convergence protocol (PDCP) duplication signaling radio bearer (SRB) information, and sidelink PDCP duplication data radio bearer (DRB) information.

3. The method of claim 1, wherein the first configuration information for the sidelink duplication transmission comprises sidelink radio bearer configuration information for the sidelink duplication transmission.

4. The method of claim 1, wherein the second configuration information for the sidelink duplication transmission comprises sidelink radio bearer configuration information for the sidelink duplication transmission.

5. The method of claim 1, wherein the obtaining of the sidelink configuration information comprises:
    transmitting, to a base station, sidelink information including at least one of the sidelink capability information, and quality of service (QOS) information of a sidelink flow; and
    receiving, from the base station, the sidelink configuration information including the first configuration information for the sidelink duplication transmission.

6. The method of claim 1, wherein the obtaining of the sidelink configuration information comprises:
    receiving, from a base station, the sidelink configuration information including the first configuration information for the sidelink duplication transmission through system information block (SIB).

7. The method of claim 1, wherein the obtaining of the sidelink configuration information comprises:
    obtaining sidelink pre-configuration information including the first configuration information for the sidelink duplication transmission.

8. The method of claim 1, further comprising:
    performing transmission of a duplicated PDCP protocol data unit (PDU) of a same PDCP entity on different sidelink carriers,
    wherein the PDCP entity is associated with different radio link control (RLC) entities,
    wherein the PDCP PDU is associated to different sidelink logical channels, and
    wherein the sidelink duplication transmission is configured for at least one of PC5-RRC and PC5-S signaling corresponding to a sidelink SRB, and PC5 data corresponding to a sidelink DRB.

9. The method of claim 1, further comprising:
    identifying a sidelink logical channel which is used for the sidelink duplication transmission.

10. The method of claim 1, further comprising:
    configuring a medium access control (MAC) entity with a sidelink logical channel; and
    indicating an allowed carrier frequency for a sidelink radio bearer.

11. A first terminal in a wireless communication system, the first terminal comprising:
    a transceiver; and
    at least one processor connected to the transceiver and configured to:
        transmit, to a second terminal, a sidelink capability information enquiry message,
        in response to the sidelink capability information enquiry message, receive, from the second terminal, sidelink capability information including capability information for a sidelink duplication transmission,
        obtain sidelink configuration information including first configuration information for the sidelink duplication transmission,
        transmit, to the second terminal, a message including second configuration information for the sidelink duplication transmission, and
        in response to the message, receive, from the second terminal, a complete message.

12. The first terminal of claim 11, wherein the capability information for the sidelink duplication transmission comprises at least one of sidelink packet data convergence protocol (PDCP) duplication signaling radio bearer (SRB) information, and sidelink PDCP duplication data radio bearer (DRB) information.

13. The first terminal of claim 11, wherein the first configuration information for the sidelink duplication transmission comprises sidelink radio bearer configuration information for the sidelink duplication transmission.

14. The first terminal of claim 11, wherein the second configuration information for the sidelink duplication transmission comprises sidelink radio bearer configuration information for the sidelink duplication transmission.

15. The first terminal of claim 11, wherein the at least one processor is configured to:
    transmit, to a base station, sidelink information including at least one of the sidelink capability information, and quality of service (QOS) information of a sidelink flow,
    receive, from the base station, the sidelink configuration information including the first configuration information for the sidelink duplication transmission.

16. The first terminal of claim 11, wherein the at least one processor is configured to:
    receive, from a base station, the sidelink configuration information including the first configuration information for the sidelink duplication transmission through system information block (SIB).

17. The first terminal of claim 11, wherein the at least one processor is configured to:
    obtain sidelink pre-configuration information including the first configuration information for the sidelink duplication transmission.

18. The first terminal of claim 11, wherein the at least one processor is further configured to:
- perform transmission of a duplicated PDCP protocol data unit (PDU) of a same PDCP entity on different sidelink carriers,
- wherein the PDCP entity is associated with different radio link control (RLC) entities,
- wherein the PDCP PDU is associated to different sidelink logical channels, and
- wherein the sidelink duplication transmission is configured for at least one of PC5-RRC and PC5-S signaling corresponding to a sidelink SRB, and PC5 data corresponding to a sidelink DRB.

19. The first terminal of claim 11, wherein the at least one processor is further configured to:
- identify a sidelink logical channel which is used for the sidelink duplication transmission.

20. The first terminal of claim 11, wherein the at least one processor is further configured to:
- configure a medium access control (MAC) entity with a sidelink logical channel,
- indicate an allowed carrier frequency for a sidelink radio bearer.

\* \* \* \* \*